(12) United States Patent
Ebisawa

(10) Patent No.: US 6,330,222 B1
(45) Date of Patent: Dec. 11, 2001

(54) TRAFFIC CONTROL APPARATUS AND TRAFFIC CONTROL METHOD USED IN EXCHANGE

(75) Inventor: Yasuharu Ebisawa, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/001,241

(22) Filed: Dec. 30, 1997

(30) Foreign Application Priority Data

Apr. 17, 1997 (JP) .................................................... 9-100139

(51) Int. Cl.[7] .................................................... G01R 31/08
(52) U.S. Cl. ............................................ 370/230; 370/232
(58) Field of Search .................................... 370/230, 235, 370/229, 233, 232, 234, 253, 395

(56) References Cited

U.S. PATENT DOCUMENTS 5,070,498 * 12/1991 Kakuma et al. ......................... 370/60
5,267,232 * 11/1993 Katsube et al. ......................... 370/17
5,280,483 * 1/1994 Kamoi et al. ......................... 370/94.1
5,781,533 * 7/1998 Manning et al. ..................... 370/236

FOREIGN PATENT DOCUMENTS 0 609 128    8/1994   (EP) .
A-53829/94   8/1994   (AU) .

OTHER PUBLICATIONS

End-to-end Priority Cell Discarding Analysis for ATM Network, David W. Petr James S. Wineinger Telecommunications and Information Sciences Laboratory, Unversity of Kansas, Lawrence, KS 66045–6929 Publication Date: Mar. 28, 1993.

* cited by examiner

Primary Examiner—Huy D. Vu
Assistant Examiner—Toan Nguyen
(74) Attorney, Agent, or Firm—Helfgott & Karas, P.C.

(57) ABSTRACT

A traffic control apparatus in an exchange, comprised of an incoming cell analyzing means for identifying if incoming cells are fixed band cells or variable band cells, separating the two, and calculating the total fixed band cell flow and the total variable band cell flow, an incoming cell amount decision means for instructing the allocation of the amount of cells to be discarded among subscribers of the variable band service by a predetermined ratio when the sum total cell flow, that is, the sum of the calculated total fixed band cell flow and total variable band cell flow, exceeds an allowable cell flow, and an incoming cell limiting means for discarding cells from among the incoming variable band cells in accordance with the instruction. Due to this, when subscribers using the variable band (e.g., UBR) service through an exchange use the exchange with a greater working band width than the allowable band width, the discarding of cells is fairly apportioned out among the subscribers.

21 Claims, 25 Drawing Sheets

TRAFFIC CONTROL APPARATUS AND TRAFFIC CONTROL METHOD USED IN EXCHANGE

BACKGROUND OF THE INVENTION

1. Field of the Invention

The present invention relates to a traffic control apparatus and traffic control method used in an exchange.

In communication services performed via an exchange, for example, asynchronous transfer mode (ATM) communication services performed via ATM exchanges, working bands are provided in various forms to the subscribers (users).

Two of the above forms in the case of ATM communication services are:

(1) The first is a fixed band (such as the "constant bit rate" (CBR)) service. This service enables a subscriber contracting with this service to always keep a predetermined fixed band width.

(2) The second is a variable band (such as the "unspecified bit rate" (UBR)) service. This service enables a subscriber contracting with this service to provisionally capture a preapplied for fixed band width, however, when the total band width used by all subscribers engaged in communications exceeds the switchable band width in the exchange, maintains communication by not using the excessive band width.

ATM exchanges further come in two types: an independent type where just one of the above fixed band service or variable band service is handled and a common use type where both of these services are handled simultaneously. The present invention relates to mainly the common use type exchange.

2. Description of the Related Art

As will be explained in detail later, assume that, in the above-mentioned common use type exchange, the traffic of some subscribers receiving the variable band service can increase in an instant due to file transfers etc. At this time, the exchange has to secure the contracted fixed band widths for subscribers receiving the fixed band (CBR) service despite the increase in the traffic caused by these subscribers.

This being the case, in order to deal with the instantaneously increased traffic, the exchange has to discard the excess amount of cells from the point of time when the band width exceeds the given band width due to the increased traffic. The discarding of the cells means a deterioration in the quality of transfer of data of the subscribers receiving the variable band service. At this time, a problem arises in fairness if the subscribers, who desire to receive service under the same conditions, are unequally disadvantaged by the deterioration of quality.

SUMMARY OF THE INVENTION

Accordingly, the object of the present invention is to provide a traffic control apparatus and a traffic control method in an exchange which enable subscribers receiving a variable band service to be equally inconvenienced by an unavoidable deterioration of quality of service at times of instantaneous increases in traffic etc.

To attain the above object, the traffic control apparatus of the present invention is comprised of an incoming cell analyzing means for identifying if incoming cells are fixed band cells or variable band cells, separating the two, and calculating the total fixed band cell flow and the total variable band cell flow, an incoming cell amount decision means for instructing the allocation of the amount of cells to be discarded among subscribers of the variable band service by a predetermined ratio when the sum total cell flow, that is, the sum of the calculated total fixed band cell flow and total variable band cell flow, exceeds an allowable cell flow, and an incoming cell limiting means for discarding cells from among the incoming variable band cells in accordance with the instruction. As a result, when subscribers using the variable band (e.g., UBR) service through an exchange use the exchange with a greater working band width than the allowable band width, the discarding of cells is fairly apportioned out among the subscribers.

BRIEF DESCRIPTION OF THE DRAWINGS

The above objects and features of the present invention will be more apparent from the following description of the preferred embodiments given with reference to the accompanying drawings, wherein.

DESCRIPTION OF THE PREFERRED EMBODIMENTS

Before describing the embodiments of the present invention, the related art and the disadvantages therein will be described with reference to the related figures.

Figure 24:
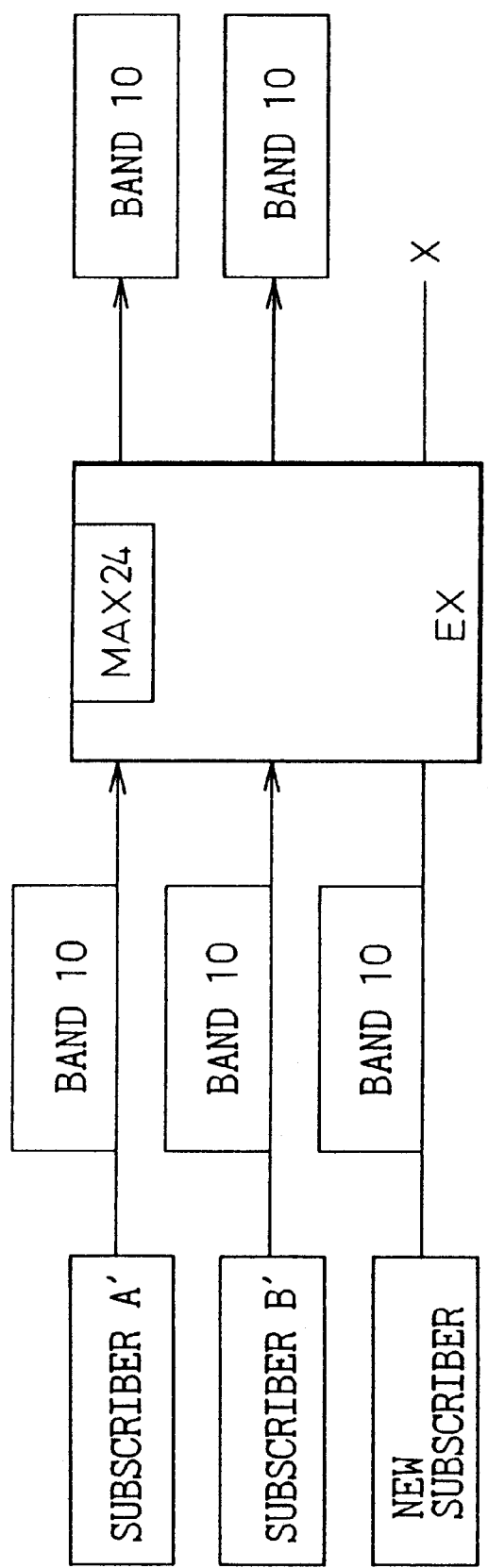
FIG. 24 is a view schematically showing the fixed band service.

FIG. 24 is a view schematically showing the fixed band service. In the figure, reference EX shows an exchange, for example, an ATM exchange. Further, MAX 24 in the figure shows illustratively the allowable band width which the exchange EX can switch.

The exchange EX providing the fixed band service accommodates under it a subscriber A' and a subscriber B' receiving fixed band services. Further, each of the fixed band widths is, e.g., "10".

The exchange EX keeps the channels of the band widths "10" of the subscribers (A' and B') open to a higher apparatus (not shown). This constitutes the fixed band service.

In this fixed band service, however, as shown in the figure, if a new subscriber ("NEW SUBSCRIBER") tries to widths becomes "30" (=10+10+10). This means that there is a shortage of a band width of exactly "6" (=30–24) with respect to the allowable band width (24) of the exchange EX and it becomes no longer possible to secure channels for accommodating new subscribers. This disadvantage can be eliminated by the following variable band service.

Figure 25:
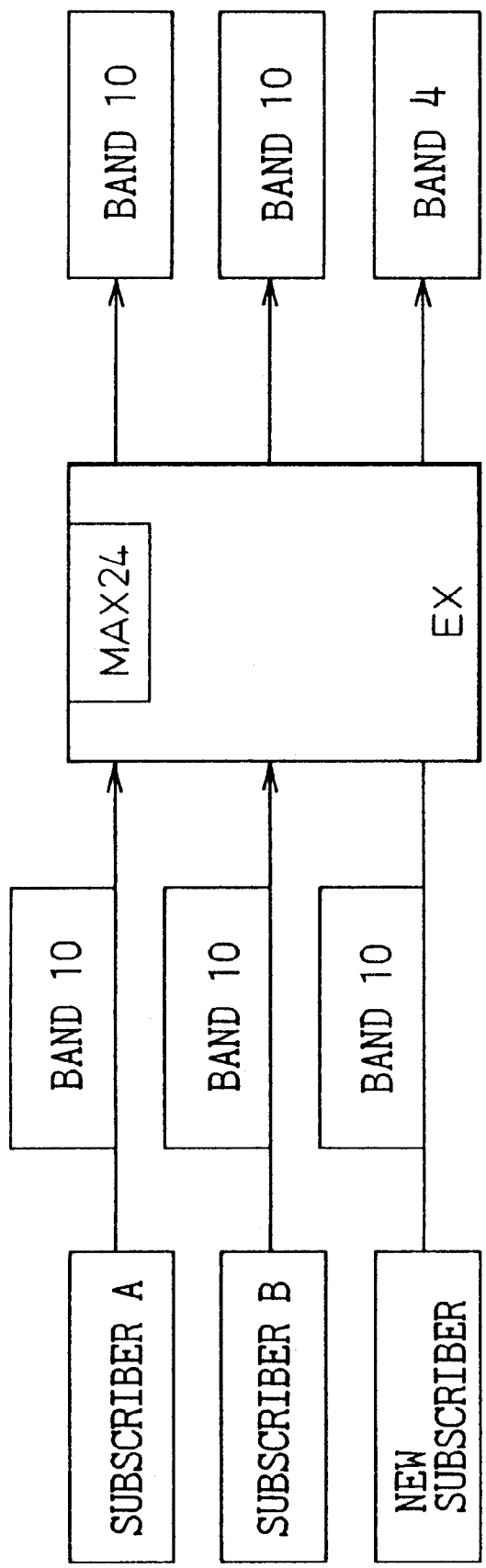
FIG. 25 is a view schematically showing the variable band service.

FIG. 25 is a view showing schematically the variable band service. The way of looking of this figure is the same as in FIG. 24.

Assume that in addition to the subscribers A and B receiving this variable band service, a new subscriber ("NEW SUBSCRIBER") first applies for a band width "10" for a variable band service. In case of this variable band service, the exchange EX can allow the new subscriber to use a channel corresponding to the available band width "4" (=24–20).

The above FIG. 24 and FIG. 25 show exchanges separately handling a fixed band service and variable band service, but there are also common use type exchanges which offer both of these services. As mentioned before, the present invention relates to such a common use type exchange.

As already explained, assume that, in the above-mentioned common use exchange, the traffic of subscribers receiving the variable band service increases for an instant due to file transfers etc. At this time, the exchange has to secure the contracted fixed band widths for subscribers A', B', . . . receiving the fixed band service despite the increase in the traffic.

This being the case, as explained above, in order to deal with the instantaneously increased traffic, the exchange has to discard the exceeded amount of cells from the point of time when the band width exceeds the given band width due to the increased traffic. The discarding of the cells means a deterioration in the quality of transfer of data of the subscribers A, B, . . . receiving the variable band service. At this time, a problem arises in fairness if the subscribers A, B, . . . , who desire to receive service under the same conditions, are unequally disadvantaged by the deterioration of quality.

The present invention provides a traffic control apparatus and traffic control method in an exchange which enable subscribers receiving a variable band service to be equally inconvenienced by an unavoidable deterioration of quality of service at times of instantaneous increases in traffic etc.

First, the principle of the present invention will be explained. The traffic control apparatus of the present invention, in view of the above problem, controls the traffic of cells on channels over which cells of a plurality of service classes (for example, the above-mentioned fixed band service class or variable band service class) are transmitted mixed together. The traffic control apparatus according to the present invention has a detecting means (1) and an adjusting means (2). More specifically, it has (1) a detecting means for detecting congestion of traffic on the channel and (2) an adjusting means for receiving notification of the detection of congestion from the detecting means and adjusting for each subscriber the degree of discarding of the cells for the plurality of subscribers belonging to the same service class.

Note that the techniques for adjustment by the adjusting means include for example i) the technique of discarding cells equally and ii) the technique of discarding cells in accordance with the ratio of the working band widths. Note that the following explanation will be made taking as an example the case where both of the fixed band service class and variable band service class exist as service classes.

Figure 1:
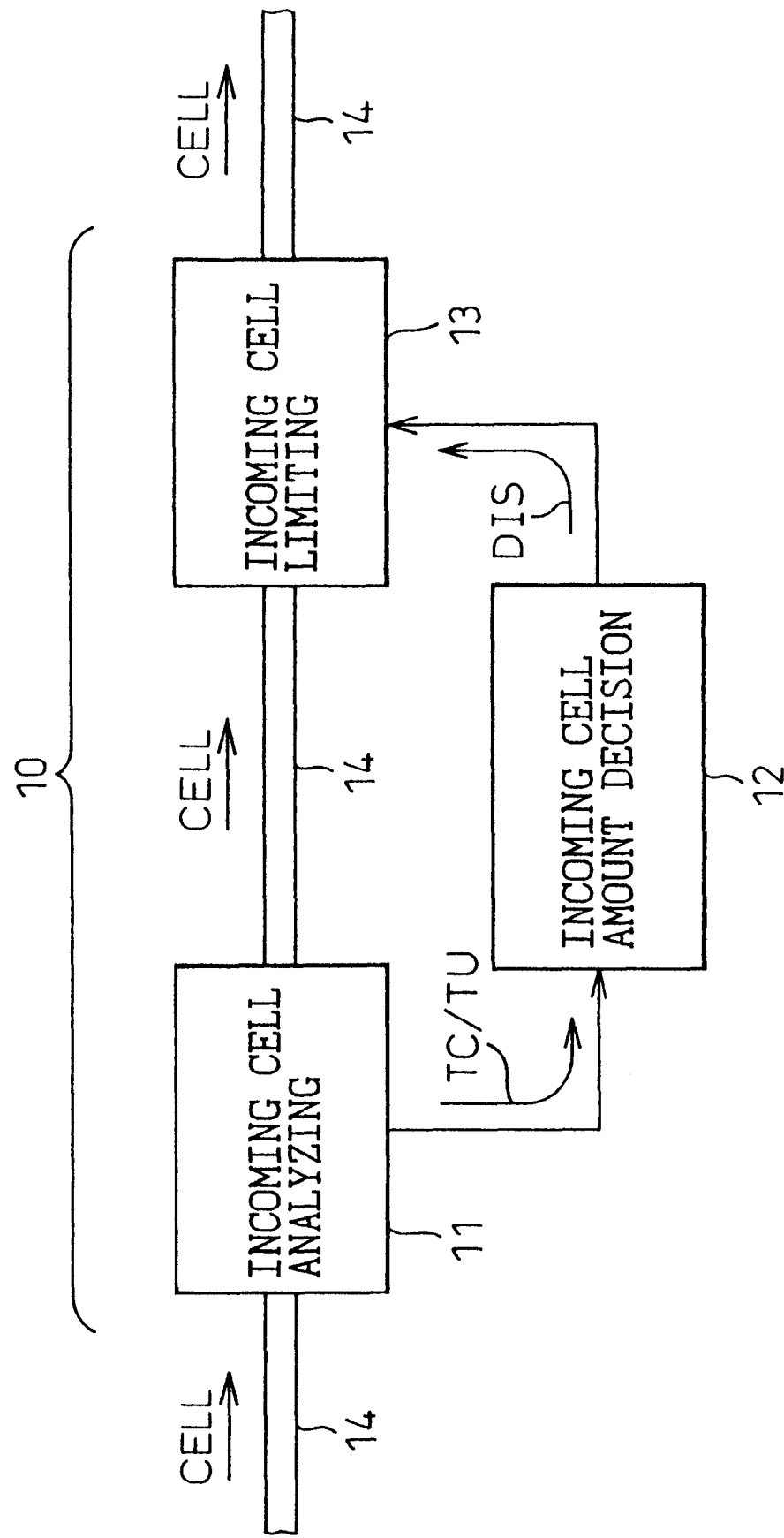
FIG. 1 is a block diagram of the basic configuration of the present invention.

FIG. 1 is a block diagram of the basic configuration of the present invention. In the figure, EX is the afore-mentioned exchange. A traffic control apparatus 10 according to the present invention is formed at part of the exchange EX.

This traffic control apparatus 10 has three main components as illustrated, that is, 11, 12, and 13. These are the incoming cell analyzing means 11, the incoming cell amount decision means 12, and incoming cell limiting means 13.

The incoming cell analyzing means 11 discriminates if cells coming in from subscribers (A, B . . . , A', B' . . . ) via a cell highway 14 are fixed band cells for which fixed band service is applied or variable band cells for which variable band service is applied, separates the two, and calculates the flow of all of the fixed band cells, that is, the total fixed band cell flow, and the flow of all of the variable band cells, that is, the total variable band cell flow.

The incoming cell amount decision means 12 outputs a cell discard instruction, when the sum of the total fixed band cell flow and the total variable band cell flow calculated by the incoming cell analyzing means 11, that is, the sum total cell flow, exceeds an allowable cell flow which can pass through the exchange EX, for allocating an amount of cells to be discarded, corresponding to the excess cell flow among subscribers (A, B . . . ) receiving the variable band service by a predetermined ratio.

The incoming cell limiting means 13 discards cells from among the incoming variable band cells for each subscriber (A, B . . . ) input to the exchange EX in accordance with the cell discard instruction output from the incoming cell amount decision means 12.

Note that in the figure, TC/TU is information indicating the above total fixed band cell flow (TC) and total variable band cell flow (TU) and DIS is information indicating the cell discard instruction.

According to the above configuration, when the traffic increases for an instant and the allowable cell flow which may pass through the exchange EX is exceeded, an amount of cells to be discarded corresponding to the excess cell flow may be equally apportioned out to the subscribers A, B . . . .

Figure 2:
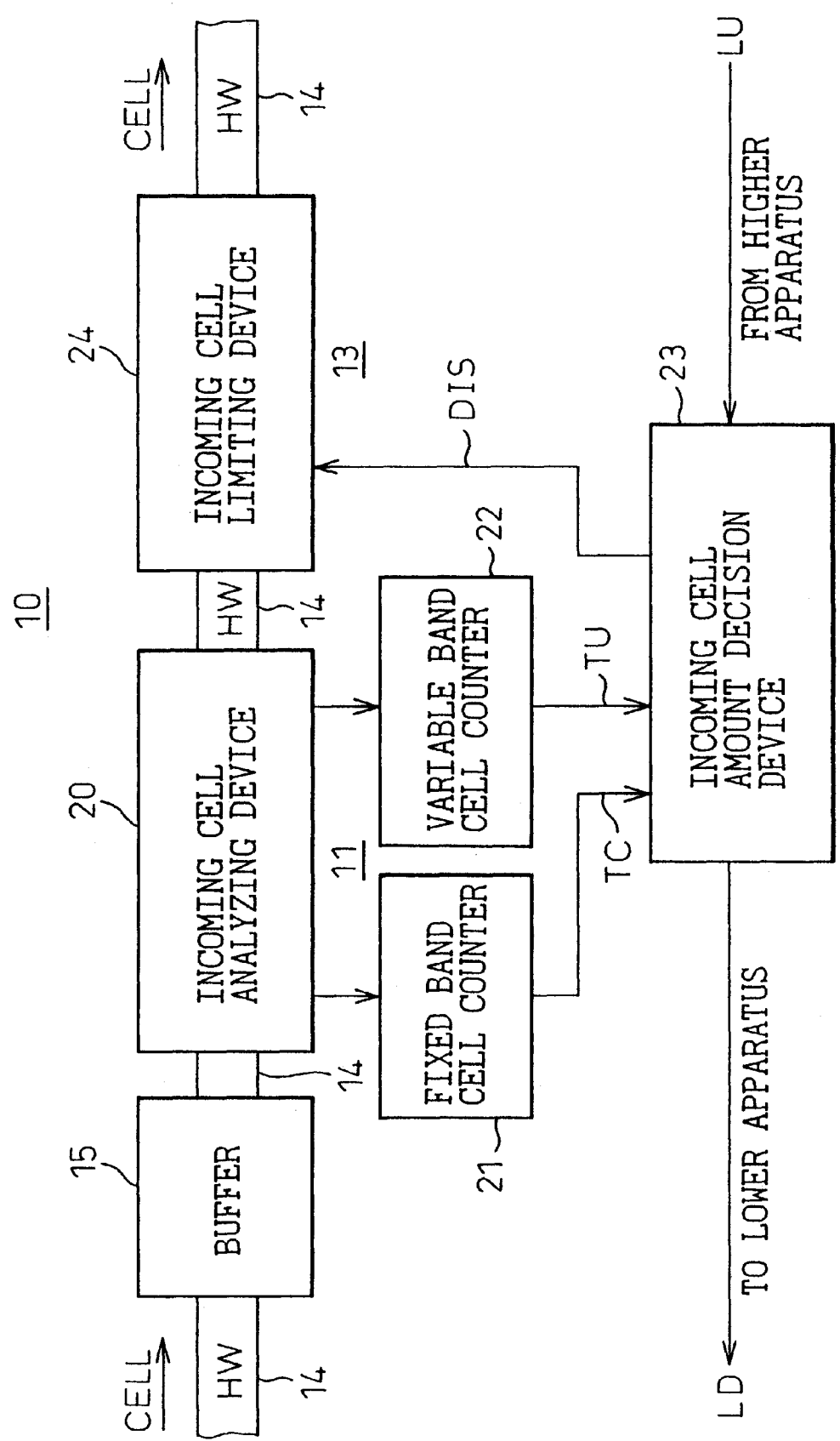
FIG. 2 is a view of an embodiment of the present invention.

FIG. 2 is a view of an embodiment of the present invention. In the figure, a cell buffer means 15 for temporarily buffering cells applied in a burst like manner is further shown. Further, the incoming cell analyzing means 11 shown in FIG. 1 is comprised, in FIG. 2, of an incoming cell analyzing device 20, a fixed band cell counter 21, and a variable band cell counter 22. The incoming cell analyzing device 20, an incoming cell limiting device 24, an incoming cell amount decision device 23, and a buffer means 15 are provided for controlling the number of cells to be discarded with respect to the subscribers A, B . . . using the variable band service when an ATM exchange system detects that the total subscriber traffic is over the available band width. By this, the number of transfer cells commensurate with the band widths applied for by the subscribers using the variable band service is ensured. Note that this traffic control apparatus 10 is comprised of the incoming cell analyzing devices 20 (including 21 and 22) and the incoming cell limiting devices 24, both provided for each of the incoming highway units, and the single incoming cell amount decision device 23 mounted in the apparatus 10. The functions of each device are explained below.

The incoming cell analyzing device 20 decides if the incoming cells are fixed band cells or variable band cells and sets the numbers of the former and latter cells in the fixed band cell counter 21 and variable band cell counter 22.

The incoming cell limiting device 24 discards cells of the variable band cells, among the cells separated into fixed band cells and variable band cells, which exceed the allowable number.

The incoming cell amount decision device 23 calculates the variable band cells which can be discarded equally for each highway based on the number of cells acceptable to the apparatus 10 and the numbers set in the fixed band cell counter 21 and the variable band cell counter 22 for each input highway and outputs a cell discard instruction DIS to the incoming cell limiting device 24 for each highway.

The traffic control apparatus 10 is provided with a port for receiving a notification LU of the cell flow limit issued from a higher apparatus in consideration of the case where a higher apparatus limits the cell flow. Similarly, it is provided with a port for outputting a notification LD of the cell flow limit to a lower apparatus.

The notification LU of the cell flow limit from the higher apparatus is given, assuming the capacity of the apparatus 10 is a total allowable band width of for example "100", when the processing ability of the higher apparatus would be insufficient and the band width of the incoming highway from the apparatus 10 is limited to "90" and therefore it is necessary to reduce the band width of the outgoing highway of the apparatus 10 from the capacity "100" to the capacity "90". This function is not necessary however if the processing capacity of the higher apparatus is sufficient and thus the maximum band width of the lower apparatus 10 side can be sufficiently covered by the higher apparatus.

The buffer means 15 is provided since it is necessary to wait until the time when the cells of a specific subscriber (connection) received continuously in a burst are placed on the next cell slot so as to enable cells commensurate with the band width applied for by the subscriber to pass through the ATM exchange system. Note that this function may be introduced in the incoming cell limiting device 24 as well.

That is, the position of placement of the buffer means 15 is not limited to the position shown in FIG. 2.

Figure 3:
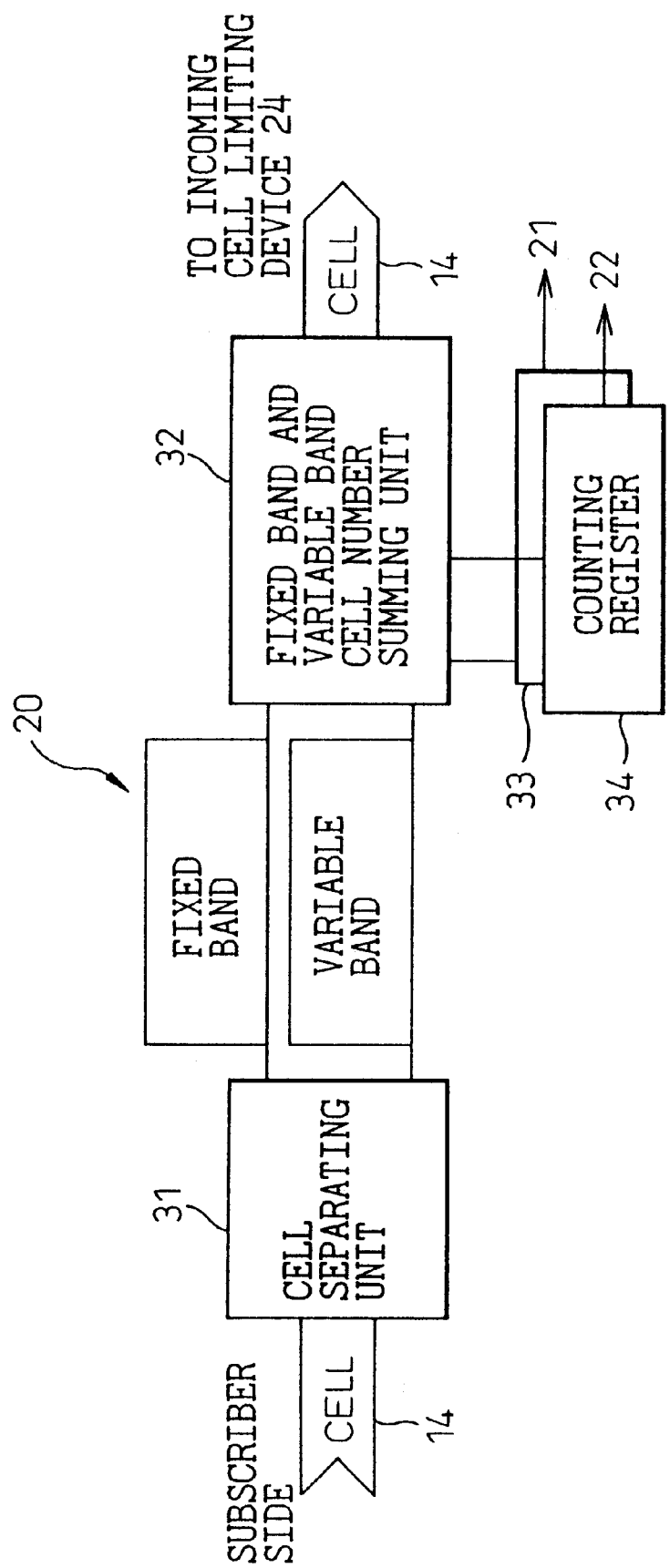
FIG. 3 is a view of an example showing the incoming cell analyzing device 20 in further detail.

FIG. 3 is a view of an example showing in more detail the incoming cell analyzing device 20. This incoming cell analyzing device 20 is provided with a cell separating unit 31. Here, the information, for example, tag, attached to each incoming cell is monitored. Each tag is a flag which shows whether the incoming cell is a fixed band cell or a variable band cell. Note that this tag may be written into the header part of a cell composed of 53 bytes, for example, or may be added to the cell.

Whether an incoming cell is one from a subscriber (A', B' . . . ) receiving a fixed band service or from a subscriber (A, B . . . ) receiving a variable band service can be discriminated from the connection with the exchange EX. Therefore, the cells with the above tags attached at the subscriber side in the exchange EX are separated into fixed band cells and variable band cells in the cell separating unit 31.

Further, the numbers of the separated fixed band cells and variable band cells are added up individually at the fixed band and variable band cell number summing unit 32. At each summing operation, the results are temporarily stored in the counting registers 33 and 34.

Figure 4:
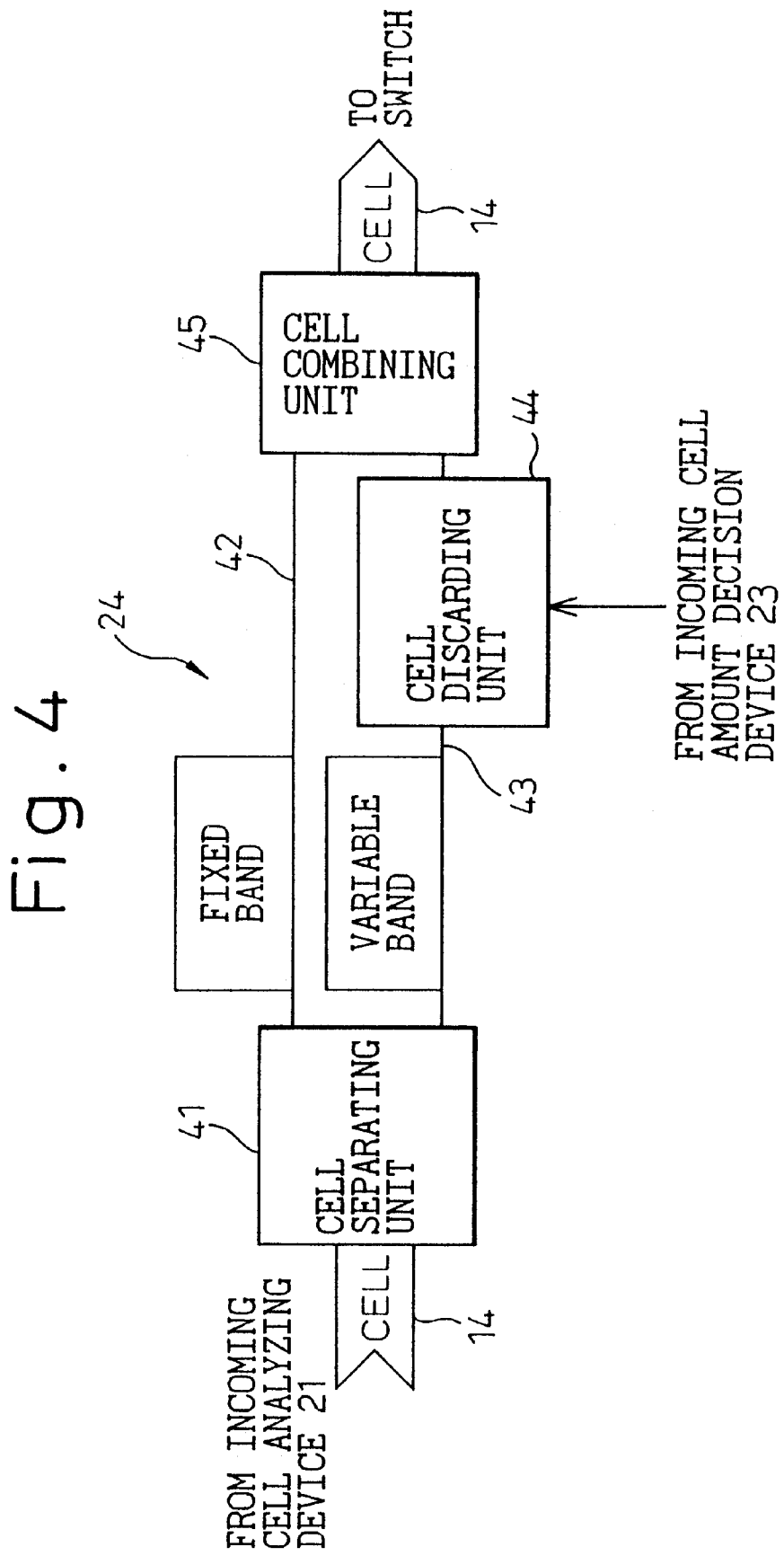
FIG. 4 is a view of an example showing the incoming cell limiting device 24 in further detail.

FIG. 4 is a view of an example showing the incoming cell limiting device 24 in further detail. In this figure, the cell separating unit 41 has exactly the same configuration as the cell separating unit 31 of FIG. 3. Here, the cells separated into the fixed band cells and variable band cells are sent through the fixed band cell highway 42 and the variable band cell highway 43, respectively. The variable band cells from the highway 43 are input to the cell combining unit 45 after an amount corresponding to the above-mentioned excess cells is discarded by the cell discarding unit 44. The cell combining unit 45 combines the fixed band cells from the highway 42 and the variable band cells from which cells have been partially discarded and inputs the combined cells through the cell highway 14 to a switch (not shown) in the exchange EX.

Here, an example of the function performed by the above incoming cell limiting means 13 (in particular the above cell discarding unit 44) will be explained. According to a first example, the incoming cell limiting means 13 has an empty cell judging unit (later mentioned 77) for judging if each of the variable band cells is an empty cell containing no significant information or not. Variable band cells judged to be empty cells by the empty cell judging unit are discarded on a priority basis. Note that whether or not a cell is empty can be judged by including a bit indicating the presence of significant information in the above-mentioned tag. Alternatively, the presence of significant information may be written in advance in a predetermined area in the header part of a 53 byte cell and judged by looking at the predetermined area.

A second example of the above function performed by the incoming cell limiting means 13 is shown below. In this second example, when the number of subscribers (A, B . . . ) receiving the variable band service is N (N is a natural number), the incoming cell amount decision means 12 (23) allocates to each subscriber an amount of cells to be discarded, corresponding to 1/N the overall amount of cells to be discarded as a cell discard instruction for each subscriber. The incoming cell limiting means 13 (44) discards the variable band cells in accordance with the allocations.

Figure 5:
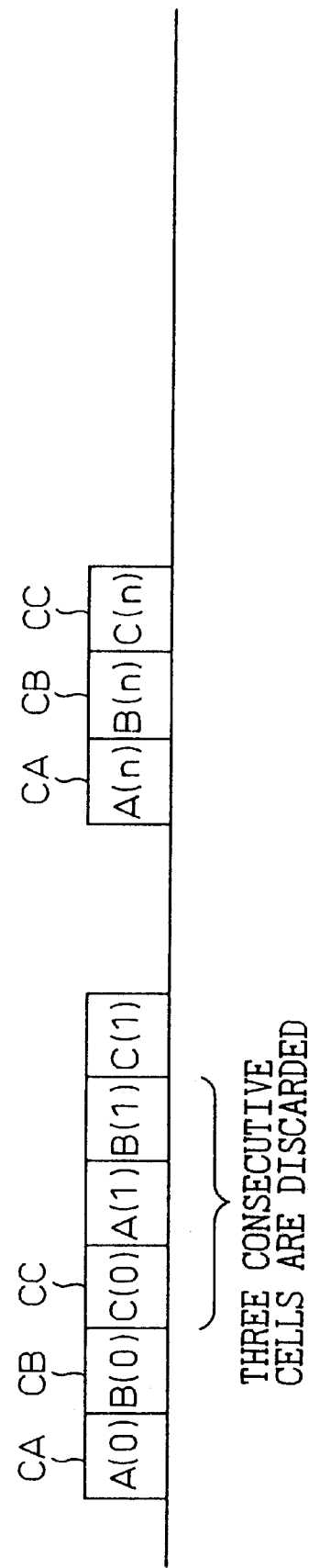
FIG. 5 is a view of the state of equal discarding of cells from a plurality of subscribers.

FIG. 5 is a view of the state of discarding cells evenly from a plurality of subscribers. When all of the incoming cells contain significant information, it is fair to discard cells evenly among the subscribers using the variable band service. The method for this will be explained below:

Assume that the cells transmitted from the subscriber A are A(0), A(1), A(2), . . . A(n), assume that the cells transmitted from the subscriber B are B(0), B(1), . . . B(n), and assume that the cells transmitted from the subscriber C are C(0), C(1), . . . C(n). When the cells from the subscribers are less than the prescribed band width, empty cells are inserted so that the cells flow in the order of the subscribers on the highways in the exchange EX. Referring to FIG. 5, the order is A(0), B(0), C(0), A(1), B(1), . . . , B(n), C(n). By using this order, if three consecutive cells are discarded, then the cells will be evenly and fairly discarded for all subscribers.

A third example of the above function of the incoming cell limiting means 13 will be explained next.

When the number of subscribers (A, B . . . ) receiving the variable band service is N (N is a natural number) and the subscribers apply for working band widths (BR: bit rate) of BR1, BR2 . . . BRN, the incoming cell amount decision means 12 (23) allocates the amount of cells to be discarded at a ratio of the working band widths BR1, BR2 . . . BRN as the cell discard instruction for each subscriber. The incoming cell limiting means 13 (44) discards variable band cells in accordance with the allocation.

Figure 6:
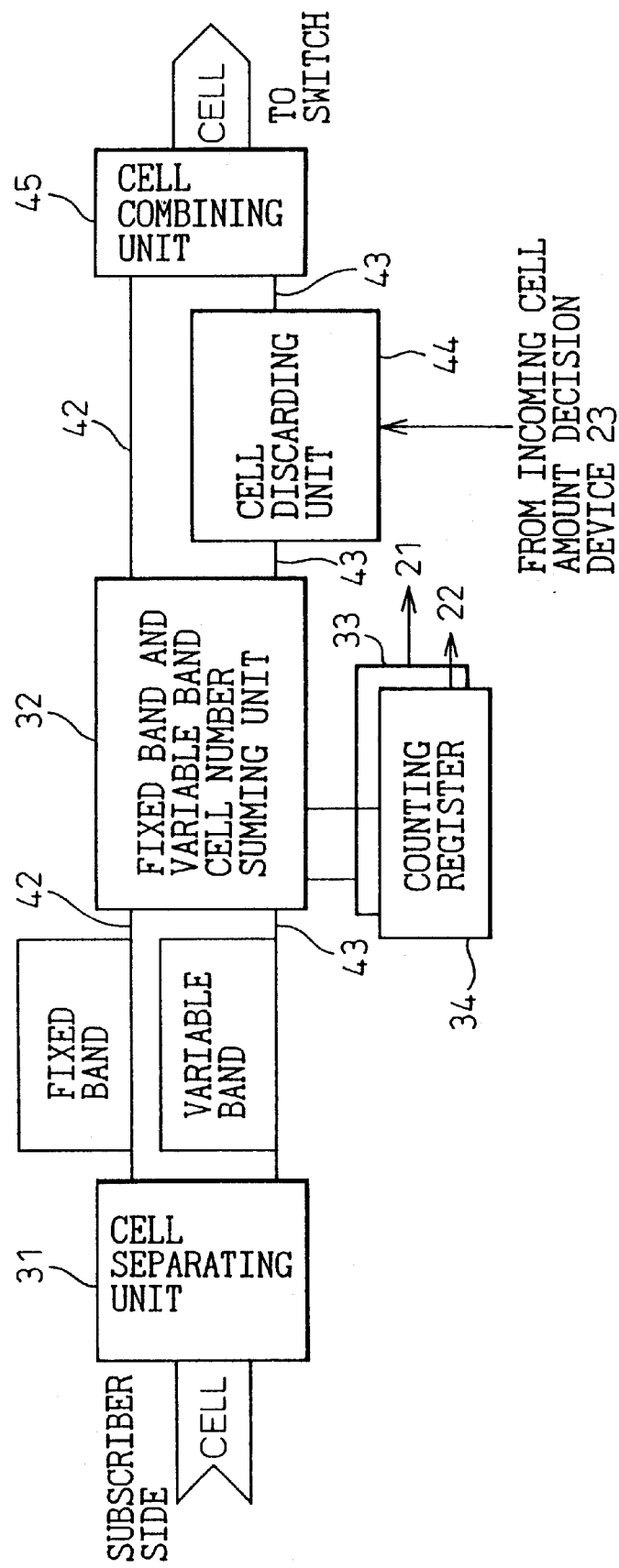
FIG. 6 is a view of an example showing the incoming cell analyzing device and incoming cell limiting device in further detail.

FIG. 6 is a view of a more detailed example of the incoming cell analyzing device and incoming cell limiting device. The configuration of the figure combines the configuration of FIG. 3 and the configuration of FIG. 4 and eliminates the cell separating unit 41 of FIG. 4. That is, at the input of the traffic control apparatus 10, the incoming cells are separated into fixed band cells and variable band cells, then processes the two cells as separated until being output from the apparatus 10.

That is, according to the embodiment of FIG. 6, provision is made of a fixed band cell highway 42 and variable band cell highway 43 for separately transferring the fixed band cells and variable band cells separated by the incoming cell analyzing means 11 (31). Also, the incoming cell limiting means 13 (44) has a cell combining unit 45 which receives fixed band cells from the fixed band cell highway 42 as they are at a first input, receives the limited variable band cells obtained by performing a cell discard operation at the cell discarding unit 44 for the variable band cells from the variable band cell highway 43 at another input, and aligns the two received inputs and outputs the same.

As opposed to this, according to the embodiment shown by both of FIG. 3 and FIG. 4, the incoming cell analyzing means 11 (31) has a first multiplexing unit (explained later) for multiplexing both the separated fixed band cells and variable band cells and placing the result on a single cell highway 14.

The incoming cell limiting means 13 (44) has a separating unit 41 for separating the cells output from the cell highway 14 once again into the fixed band cells and variable band cells and a later-mentioned second multiplexing unit (corresponding to cell combining unit 45) for multiplexing the limited variable band cells obtained by performing a cell discard operation on the separated variable band cells and the above output cells and outputting the same.

The incoming cell amount decision device 23 in FIG. 2, forming the incoming cell amount decision means 12 performs at least one of the functions of the following functions:

(i) Allocating to each subscriber an amount of cells to be discarded corresponding to 1/N the total amount of cells to be discarded, as a cell discard instruction DIS for each subscriber when the number of subscribers (A, B . . . ) receiving the variable band service is N. (ii) Allocating amounts of cells to be discarded by the ratio of the working band widths BR1, BR2 . . . BRN as cell discard instruction DIS for each subscriber when the number of subscribers (A, B . . . ) receiving the variable band service is N and the subscribers apply for the working band widths (BR) as BR1, BR2 . . . BRN.

In FIG. 2, the cell discard instruction DIS is transferred by communication among the incoming cell amount decision device 23 serving as the incoming cell amount decision means 12 (FIG. 1) and the incoming cell limiting device 24 serving as the incoming cell limiting means 13 (FIG. 1). There is a communication means for this purpose. The following three embodiments of this may be considered:

(i) A communications means I for the incoming cell amount decision means 12 to obtain cell flow information relating to the total fixed band cell flow and the total variable band cell flow from the incoming cell analyzing means 11, which communication means I transfers the cell flow information by a periodic read method.

(ii) A communications means II for the incoming cell amount decision means 12 to obtain cell flow information relating to the total fixed band cell flow and the total variable band cell flow from the incoming cell analyzing means 11, which communication means II transfers the cell flow information by an interrupt notifying method which starts an interruption when the cell flow information changes.

(iii) A communications means III for the incoming cell amount decision means 12 to obtain cell flow information relating to the total fixed band cell flow and the total variable band cell flow from the incoming cell analyzing means 11, which communication means III transfers the cell flow information by a DMA communications method when the cell flow information changes.

The incoming cell amount decision device 23 serving as the incoming cell amount decision means 12, as explained above, has to consider a notification LU of the cell flow limit issued from the higher apparatus, when receiving LU, at the time of deciding on the amount of cells to be discarded. In this case, the traffic control apparatus 10 is configured as follows. That is, when the incoming cell flow is limited in a higher apparatus located higher side than the exchange EX, to receive the limiting information showing the limited incoming cell flow from the higher apparatus, the incoming cell analyzing means 11 (20) is provided with a transmitting unit (later explained as 67) for transmitting the sum total cell flow information to the higher apparatus.

The incoming cell amount decision means 12 (23) responds to the above sum total cell flow information and sets the amount of cells to be discarded based on the allowable cell flow reduced by the provided limiting information. Note that the higher apparatus spoken of here refers to the higher exchange or network.

While the present invention was summarized above, the various methods which can be grasped by this explanation are summarized as follows:

(1) First, basically, there is the method comprised of the following first step to fourth step:

The first step discriminates if cells coming in from subscribers are fixed band cells for which fixed band service is applied or variable band cells for which variable band service is applied and separates the two.

The second step calculates the total flow of all of the fixed band cells, that is, the total fixed band cell flow, and the total flow of all of the variable band cells, that is, the total variable band cell flow.

The third step outputs a cell discard instruction, when the sum of the total fixed band cell flow and the total variable band cell flow calculated, that is, the sum total cell flow, exceeds an allowable cell flow which can pass through the exchange EX, for allocating an amount of cells to be discarded, corresponding to the excess cell flow among subscribers receiving the variable band service by a predetermined ratio.

The fourth step discards cells from among the incoming variable band cells input to the exchange for each subscriber in accordance with the above output cell discard instruction.

(2) The above steps of (1) further include a step of temporarily buffering the cells received in a burst. This is done by the buffer means 15 of FIG. 2. The position where the buffer means 15 is placed, however, is not limited to that illustrated and may be at a later stage, as well.

(3) The above third step of (1), when the number of subscribers A, B . . . receiving the variable band service is N, allocates an amount of cells to be discarded, corresponding to 1/N the amount of cells to be discarded, to each of the subscribers as a cell discard instruction for each subscriber.

An example will be shown below.

Assume that the number of cells per unit time able to be processed in the ATM exchange system is 100 cells.

When the subscriber A is transmitting 20 cells, the subscriber B 50 cells, the subscriber C 30 cells, and the subscriber D 40 cells, the total of the cells of all of the subscribers becomes 140 cells. This total number of cells exceeds the total number of cells which can be processed by the ATM exchange system by 40 (=140−100) cells.

Therefore, these 40 cells are allocated among four subscribers and 10 cells are to be discarded per subscriber. As a result, the allocation of cells to the subscribers becomes 10 cells for the subscriber A, 40 cells for the subscriber B, 20 cells for the subscriber C, and 30 cells for the subscriber D or a total of 100 cells.

(4) The third step of the above (1), when the number of subscribers A, B . . . receiving the variable band service is N and these subscribers apply for BR1, BR2 . . . BRN as working band widths (BR), allocates the amount of cells to be discarded by ratios of the working band widths BR1, BR2 . . . BRN, as the cell discard instruction, for each subscriber.

An example of this will be given next.

Assume that the number of cells per unit time able to be processed in the ATM exchange system is 100 cells.

When the subscriber A is transmitting 20 cells, the subscriber B 50 cells, the subscriber C 30 cells, and the subscriber D 40 cells, the total of the cells of all of the subscribers becomes 140 cells. This total number of cells exceeds the total number of cells which can be processed by the ATM exchange system by 40 (=140−100) cells.

Therefore, these 40 cells are allocated by the ratio of the working band widths of the subscribers and 40/140 or 29 percent of the total cells is discarded. Since the amount of cells to be discarded is allocated among the subscribers, the subscriber A has 6 cells (=20/140×40) to be discarded, the subscriber B 15 cells (=50/140×40) to be discarded, the subscriber C 9 cells (=30/140×40) to be discarded, and the subscriber D 12 cells (=40/140×40) to be discarded. As a result, the cell flow allotted to the subscribers becomes 14 cells for the subscriber A, 35 cells for the subscriber B, 21 cells for the subscriber C, and 28 cells for the subscriber D or a total of 98 cells.

(5) The fourth step of the above (1) decides if each variable band cell is an empty cell including no significant information or not and discards cells giving priority to variable band cells decided to be empty cells.

(6) The first step of the above (1) adds to the input cells at least information (tags) for identifying if they are fixed band cells or variable band cells.

(7) The fourth step of the above (1) has
a step for aligning the cells CA, CB, CC . . . input from a plurality of subscribers A, B, C . . . repeatedly in the order of A, B, C . . . and
a step for discarding from the input cells at least one unit's worth of cells, a unit being the number of cells equal to the number of subscribers (see FIG. 5).

Below, a more detailed example of the configuration of the traffic control apparatus 10 of the present invention will be given.

Figure 7:
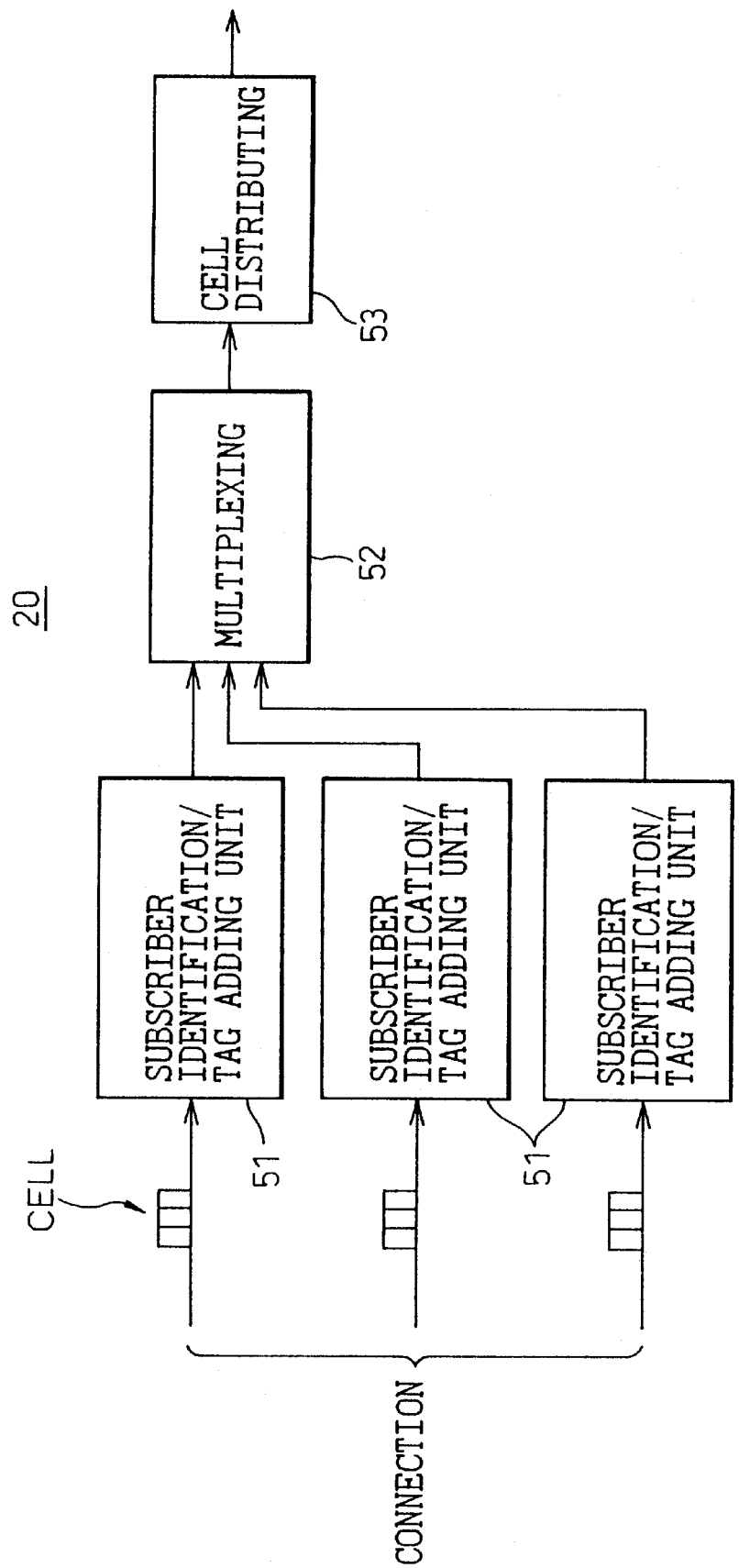
FIG. 7 is a view of a more detailed example of the incoming cell analyzing device 20.

FIG. 7 is a view of a more detailed example of the incoming cell analyzing device 20. In the figure, 51 is a subscriber ID and tag adding unit provided for each subscriber highway. Each (51) can immediately discriminate to which subscriber it is connected in accordance with the connections of the exchange EX to which the subscriber ID and tag adding units 51 are connected.

Therefore, since the cells handled are determined to be fixed band cells or variable band cells in accordance with each identification, each unit 51 adds to each input cell a tag written by a bit corresponding to the above determination. The group of input cells given with tags by the subscriber ID and tag adding units 51 are multiplexed once at the multiplexing unit 52 and then sent from the cell distributing unit 53 to the incoming cell limiting device 24.

Figure 8:
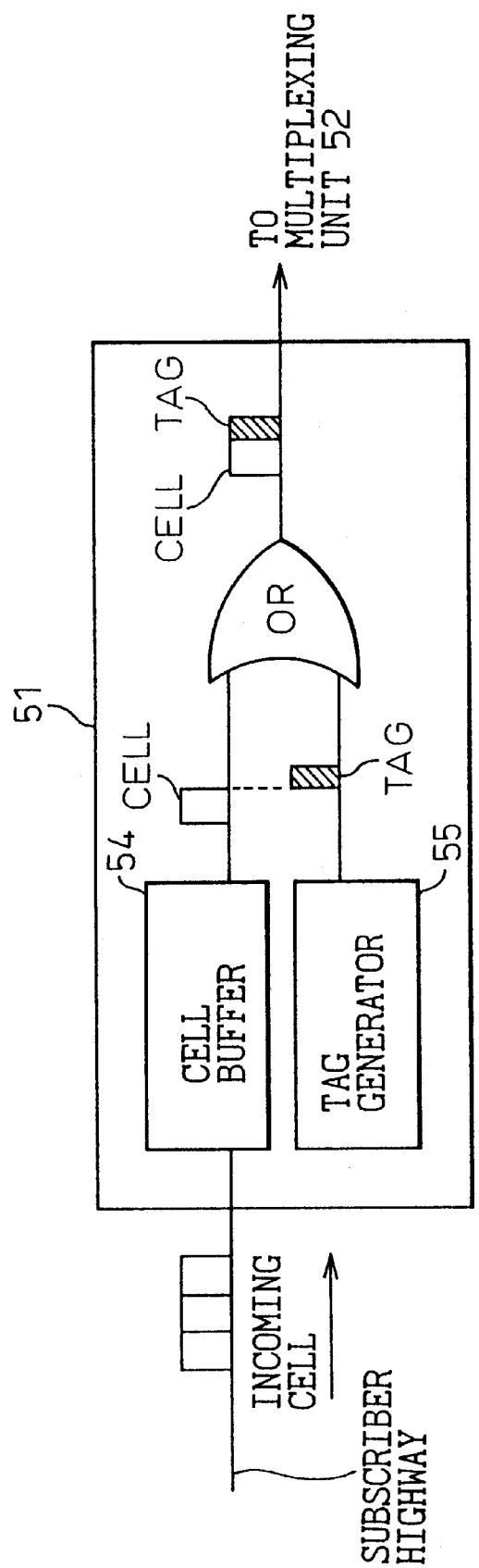
FIG. 8 is a view of a specific example of a subscriber identification/tag adding unit 51.

FIG. 8 is a view of a detailed example of the subscriber ID and tag adding unit 51. The cells input from a subscriber highway are stored once in the cell buffer 54 and are taken out one by one. On the other hand, the tags are output one by one from a tag generator 55. The cells and tags are coupled by an OR gate "OR" and are sent integrally to the multiplexing unit 52.

Figure 9:
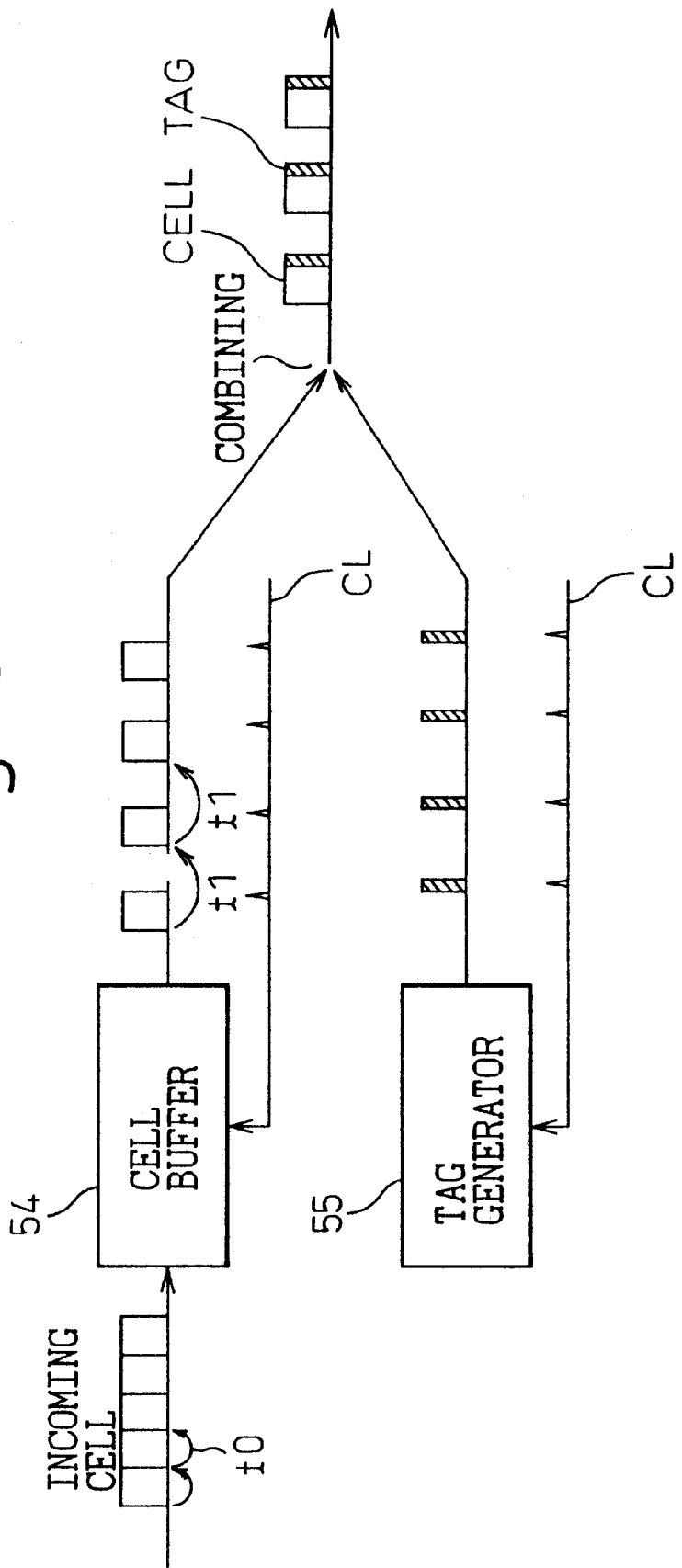
FIG. 9 is a view of the operation of the circuit of FIG. 8.

FIG. 9 is a view of the operation of the circuit of FIG. 8. The incoming cells are transferred with almost no space between them, so to add a tag to each cell, it is necessary to make a space for inserting the tag between one cell and another. For example, if each input cell is transferred at a time interval of t0, it is necessary to lengthen the time interval to t1 and rearrange the cells (t1>t0).

Therefore, the cells are read out from the cell buffer 54 in synchronization with a predetermined clock CL. Further, the tags are produced from the tag generator 55 in synchronization with the clock CL as well.

Note that since the cells are read out at the lengthened time intervals, the cell speed ends up falling by that amount. Accordingly, actually, it is necessary to form one more cell trains each the same as the cell train shown in the figure to perform parallel processing thereby. The same is true for the tags.

As explained above, the incoming cell analyzing means 11 preferably has an identification information adding unit (above mentioned subscriber ID and tag adding unit 51) which adds at least information for identifying if the cell is fixed band cell or variable band cell to each of the input cells.

Figure 10:
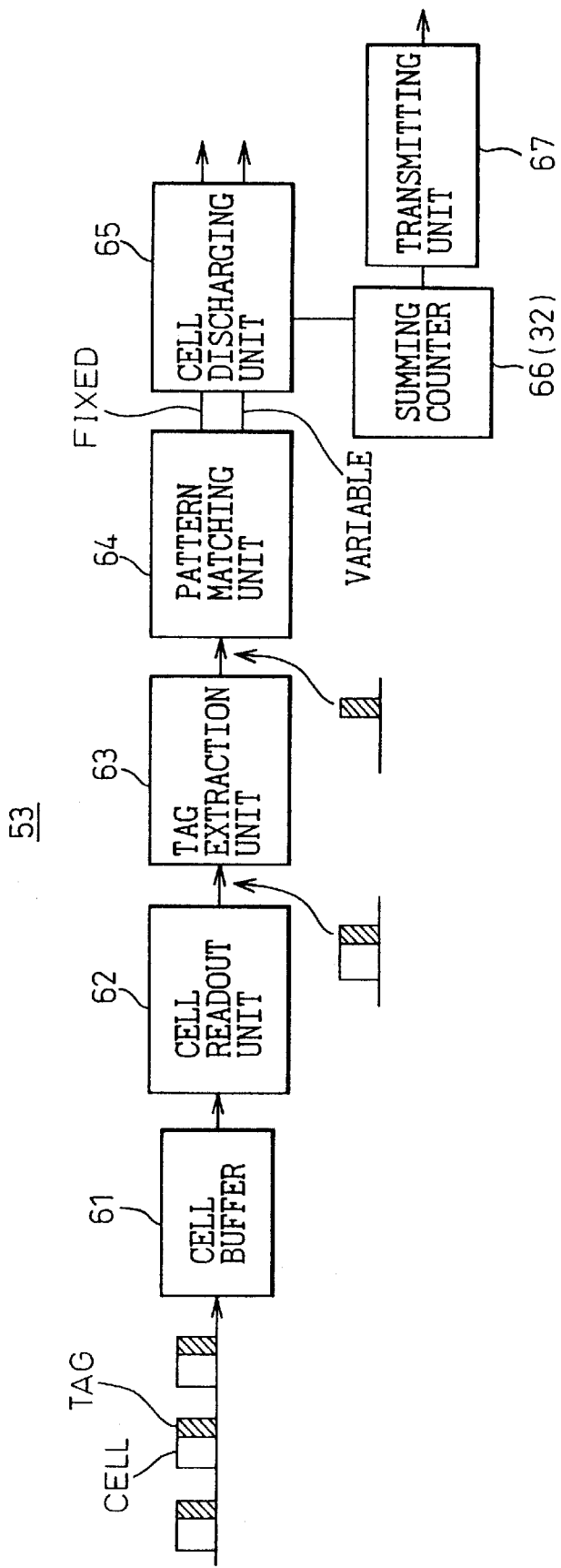
FIG. 10 is a view of a specific example of the cell distributing unit 53 in FIG. 7.

FIG. 10 is a view of a more detailed example of the cell distributing unit 53 in FIG. 7. The pairs of cells and tags from the multiplexing unit 52 are stored successively in the cell buffer 61 and are successively taken out from the cell readout unit 62. Just the tag part is extracted by the tag extraction unit 63 (cells flow as they are). The extracted tags are input to a pattern matching unit 64. If the bit pattern written in the tag is for example "X", it is learned that the cell is a fixed band cell, while for example if it is "Y", it is learned that the cell is a variable band cell.

The cells flowing as they are are sent from the cell discharging unit 65 to the incoming cell limiting device 24. On the other hand, the number of the cells separated according to the tags are counted by the summing counter 66 (corresponding to 32 in FIG. 3). The previously mentioned transmitting unit is shown by 67 and sends information on the sum total cell flow to a higher apparatus.

Figure 11:
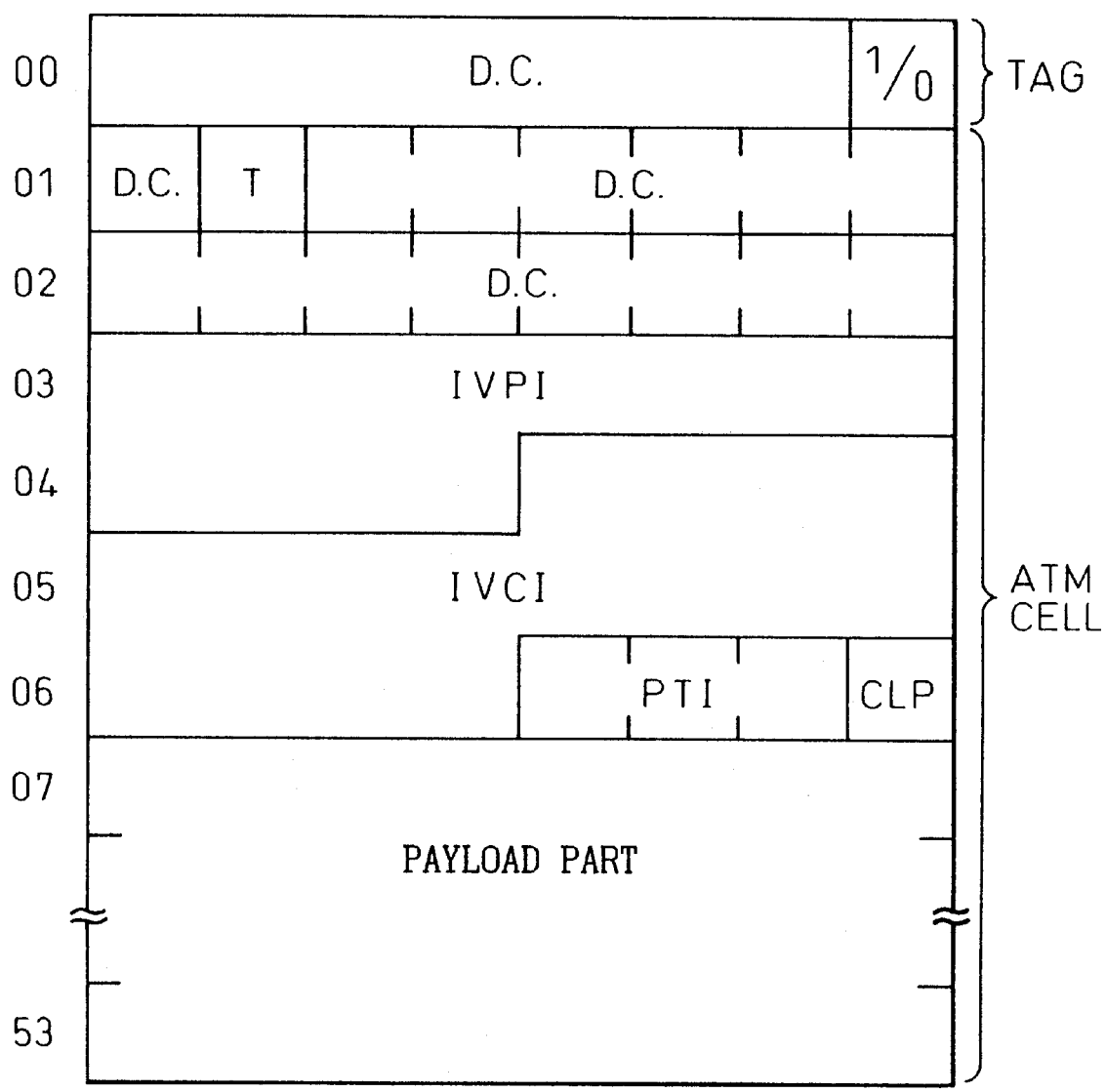
FIG. 11 is a view of a specific example of a tag.

FIG. 11 is a view of a concrete example of a tag. The figure shows a tag for identifying if a cell is a fixed band cell or a variable band cell. Note that as the bit pattern of the tag, the simplest 1-bit pattern is shown.

In the figure, the second octet (01) to the 54th octet (53) are the part of a general ATM cell. The tag according to the present invention is formed at the heading portion of the ATM cell, that is, the first octet (00). In the figure, a 1-bit pattern (1/0) tag is formed at the position of the bit 0. If 0, it indicates that the ATM cell is a fixed band cell, while conversely if 1, it indicates that the ATM cell is a variable band cell.

Figure 12:
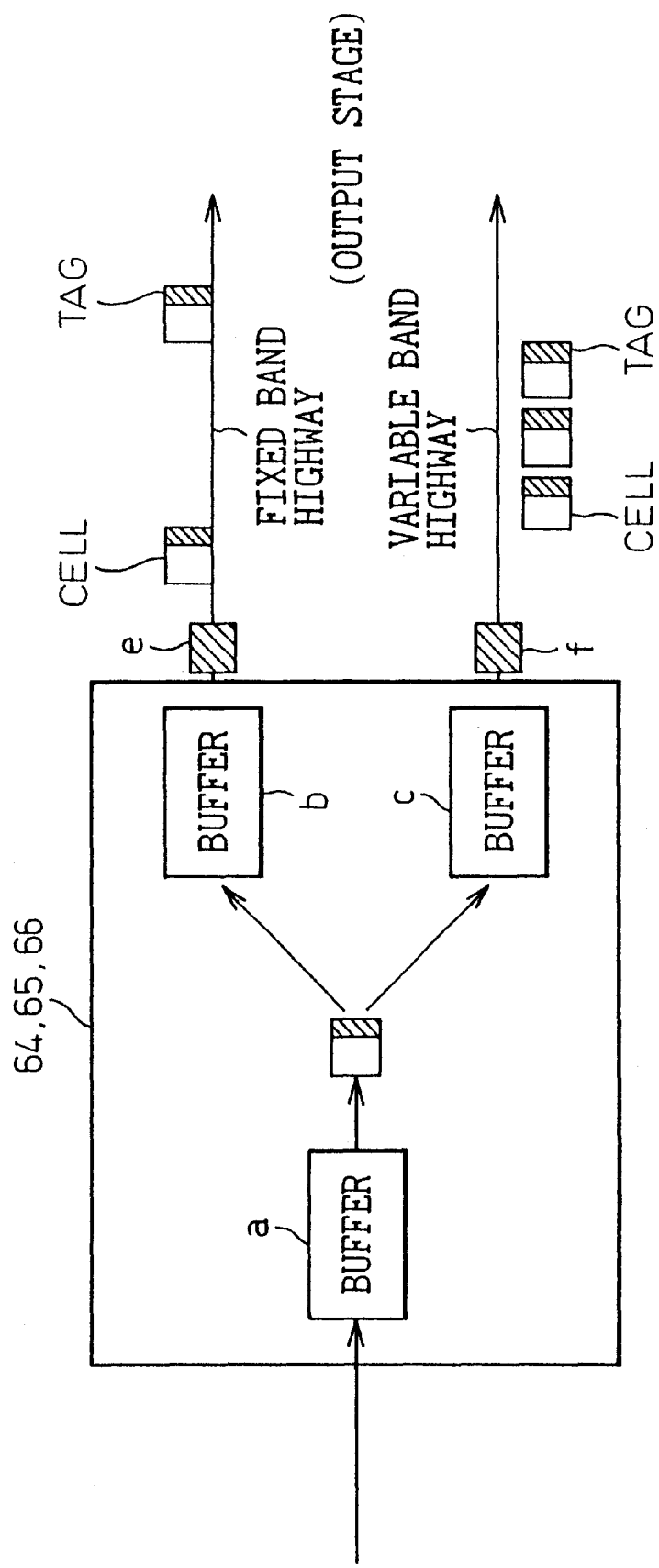
FIG. 12 is a view schematically showing the functions of the components 64, 65, and 66 in FIG. 10.

Note that the meanings of the abbreviations in the figure are as follows:

DC: Don't care
T: Test bit
IVPI: Input virtual path identifier
IVCI: Input virtual channel identifier
PTI: Payload type identifier
CLP: Cell loss priority FIG. 12 is a view illustrating the functions of the components 64, 65, and 66 in FIG. 10. The input cells are stored once in the buffer a, then are separated into the upper side (fixed band) or the lower side (variable band) in the figure according to the content of the tags.

The cells separated at the upper side and lower side are respectively stored in the buffers b and c in the figure. The immediately following counters e and f then count the number of cells transmitted on the fixed band highway and variable band highway each time they are transmitted.

Figure 13:
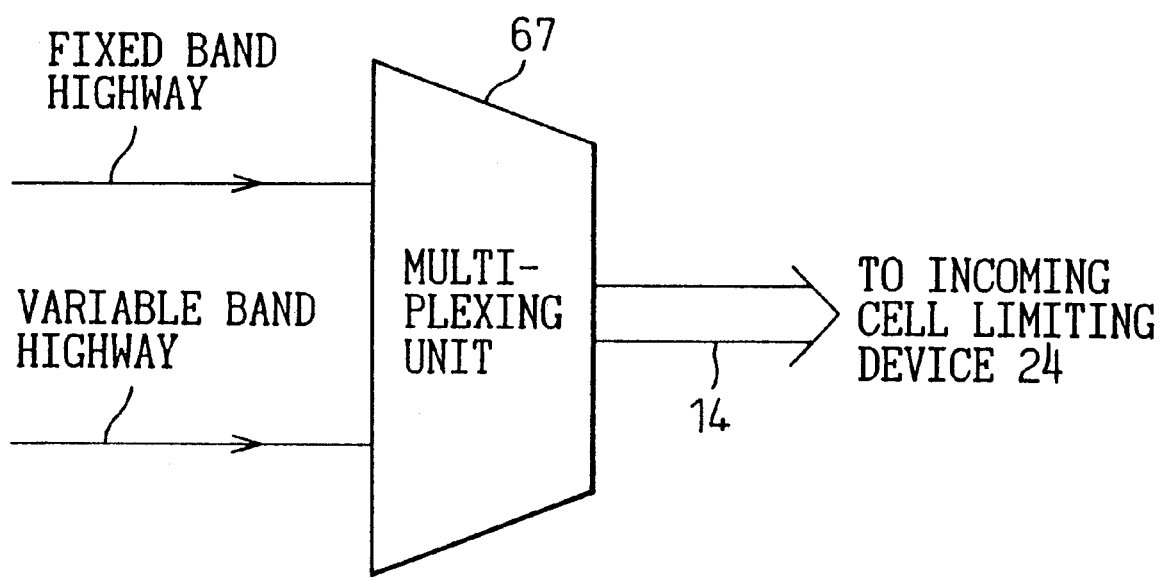
FIG. 13 is a view of an example of an output stage of the configuration shown in FIG. 12.

FIG. 13 is a view of an example of an output stage of the configuration shown in FIG. 12. The cells from the incoming cell analyzing device 20 are multiplexed once again by the multiplexing unit 67 and input to the incoming cell limiting device 24. The multiplexing device 67 is the "first multiplexing unit for multiplexing the separated fixed band cells and variable band cells and placing them on a single cell highway 14" previously explained in relation to FIG. 3 and FIG. 4.

Figure 14:
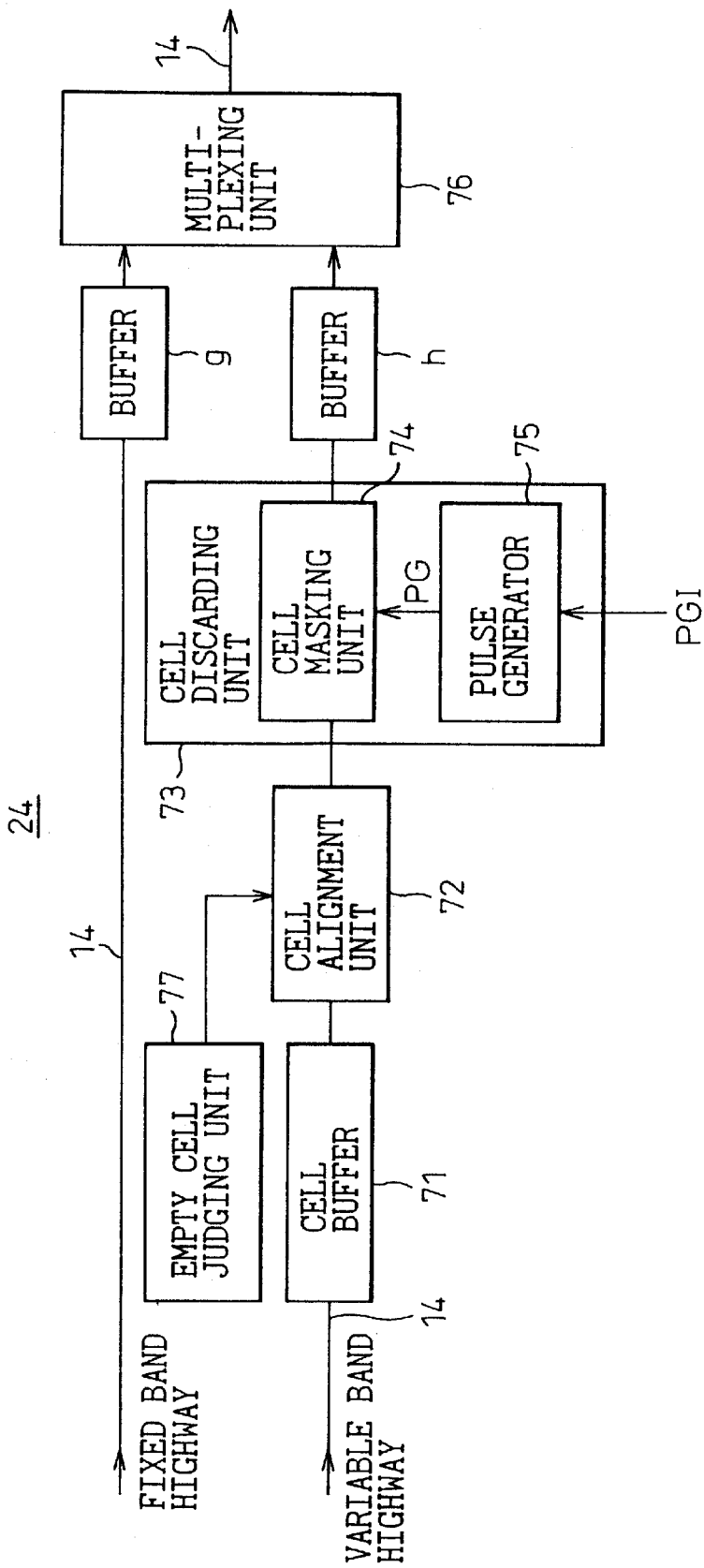
FIG. 14 is a view of a more detailed example of an incoming cell limiting device 24.

FIG. 14 is a view of a detailed example of an incoming cell limiting device 24. In the figure, the incoming cell limiting device 24 serving as the incoming cell limiting means 13 has a cell alignment unit 72 for aligning the cells CA, CB, CC . . . (FIG. 5) input from a plurality of subscribers (A, B, C . . . ) repeatedly in the order of A, B, C . . . and a cell discarding unit 73 for discarding at least one unit's worth of cells, a unit being the number of cells equal to the number of subscribers, from the input cells.

The cell alignment unit 72 is realized by a selector which successively takes out the group of cells accumulated in the cell buffers 71 for each subscriber (A, B, C) after removing the empty cells by the empty cell decision unit 77, such as A→B→C→A→B→C.

The cell discarding unit 73 includes the empty cell judging unit 77 and functions to take out groups of cells aligned as ABCABC . . . in units of ABC. In the figure, it is comprised of a cell masking unit 74 and a pulse generator 75. The limited variable band cells obtained here are input through the buffer h to the multiplexing unit 76. On the other hand, the fixed band cells are input through the buffer g to the multiplexing unit 76. The two are multiplexed, then sent to a switch (not shown) of an exchange EX. The multiplexing unit 76 shown here is the "second multiplexing unit for multiplexing the limited variable band cells obtained by performing a cell discard operation on the separated variable band cells and the above output cells and outputting the same" (corresponding to the cell combining unit 45).

Figure 15:
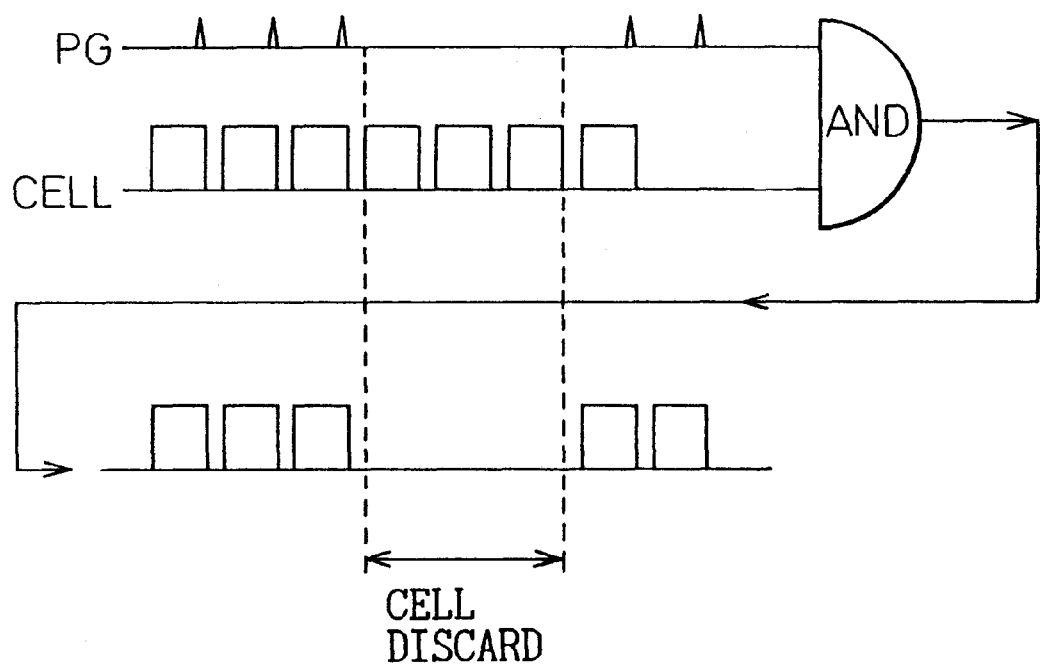
FIG. 15 is a time chart showing schematically the operation of the cell masking unit 74 in FIG. 14.

FIG. 15 is a time chart illustrating the operation of the cell masking unit 74 in FIG. 14. Cells, having the empty cells removed, input from the cell alignment unit 72 are input to the AND gate "AND". On the other hand, the pulses PG, partially pulse cancelled, from the pulse generator 75 are input to the AND gate "AND". Therefore, the "CELL DISCARD" in the figure shows the group of discarded cells.

Figure 16:
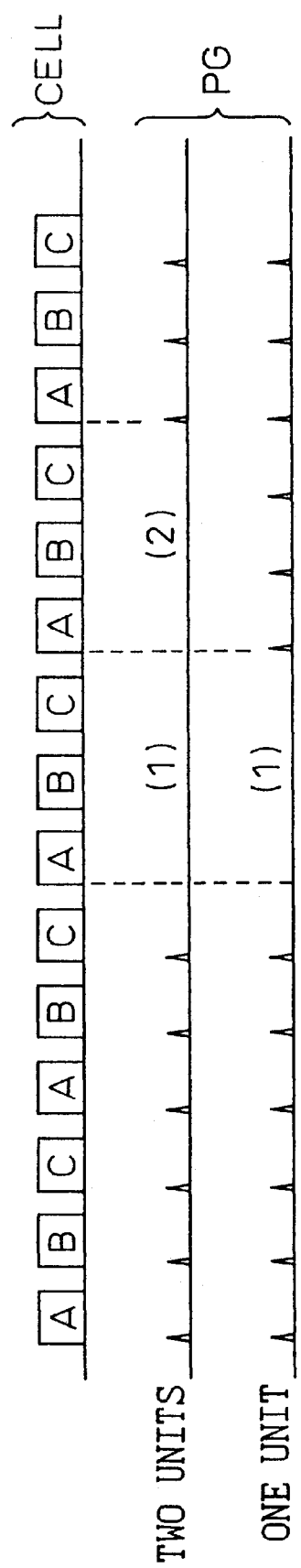
FIG. 16 is a time chart showing schematically an example of discarding one unit worth of cells and discarding two units' worth of cells in FIG. 15.

FIG. 16 is a time chart illustrating an example of discarding one unit's worth of cells and two units' worth of cells in FIG. 15. For simplification, however, the example is shown of the subscribers A, B, and C. With two units, cells are discarded as ABCABC. With one unit, the cells are discarded as ABC.

Figure 17:
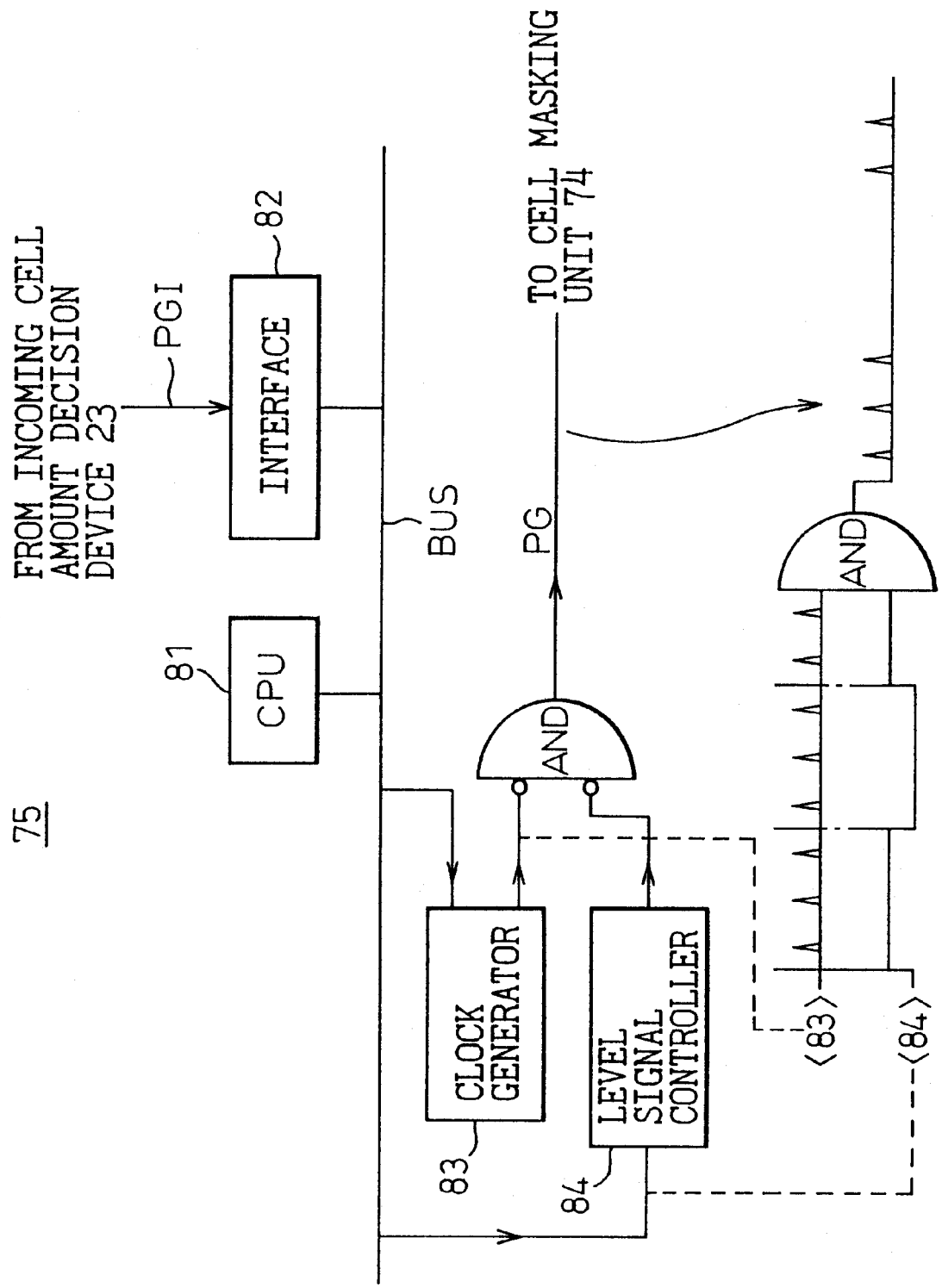
FIG. 17 is a view of an example of the configuration of the pulse generator 75 shown in FIG. 14.

FIG. 17 is a view of an example of the configuration of the pulse generator 75 shown in FIG. 14. The pulse generation input PGI from the incoming cell amount decision device 23 is received by the interface 82 and sent to the CPU 81 through a bus. The CPU 81 controls the clock generator 83 and the level signal controller 84 based on this. The output from the clock generator 83 and the output from the level signal controller 84 are shown by the time charts of <83> and <84> in the figure and obtain the pulse PG, partially pulse cancelled, from the AND gate "AND".

The level signal controller 84 outputs a "1" or "0" logical signal in accordance with the cell discard instruction from the incoming cell amount decision device 23.

Note that the interface 82 constitutes part of the previously mentioned communications means and realizes communication by the above-mentioned periodic read method, interrupt notification method, or DMA communication method.

Figure 18:
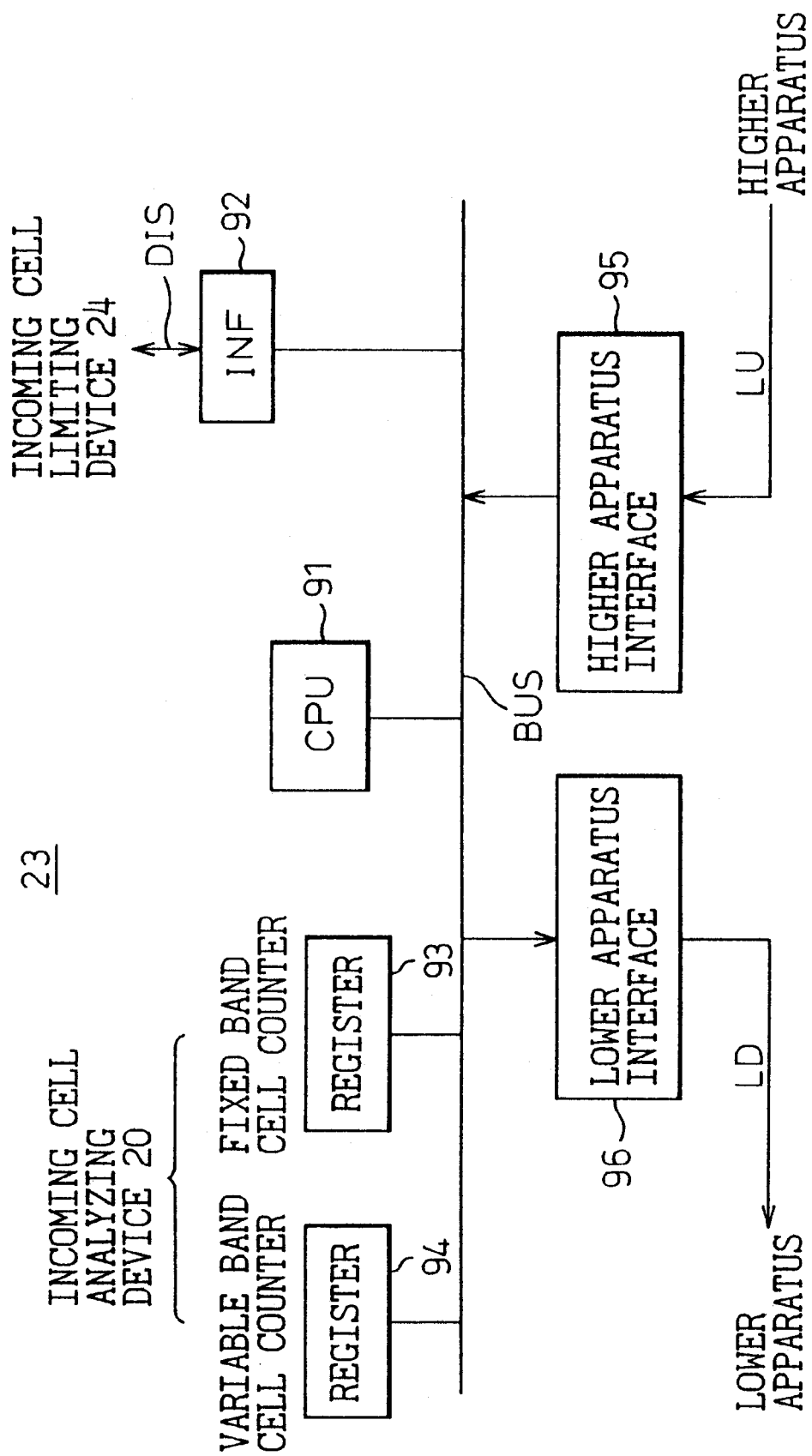
FIG. 18 is a view of an example of the configuration of the incoming cell amount decision device 23.

FIG. 18 is a view of an example of the configuration of the incoming cell amount decision device 23. The overall control is handled by the CPU 91. The CPU 91 communicates signals, through the bus, with the interface (INF) 92, registers 93 and 94, and interfaces 95 and 96.

The main role of the CPU 91 is to determine the amount of cells to be discarded by the various computations explained in detail above referring to the total fixed band cell flow (register 93) and the total variable band cell flow (register 94) obtained from the incoming cell analyzing device 20. At this time, the notification LU of the cell flow limit issued from a higher apparatus obtained through the higher interface 95 is also taken into consideration.

The information on the thus calculated amount of cells to be discarded is sent through the interface 92 to the incoming cell limiting device 24. The interface 92 constitutes part of the previously mentioned communications means and realizes communication by the periodic read method, interrupt notification method, or DMA communication method.

Figure 19:
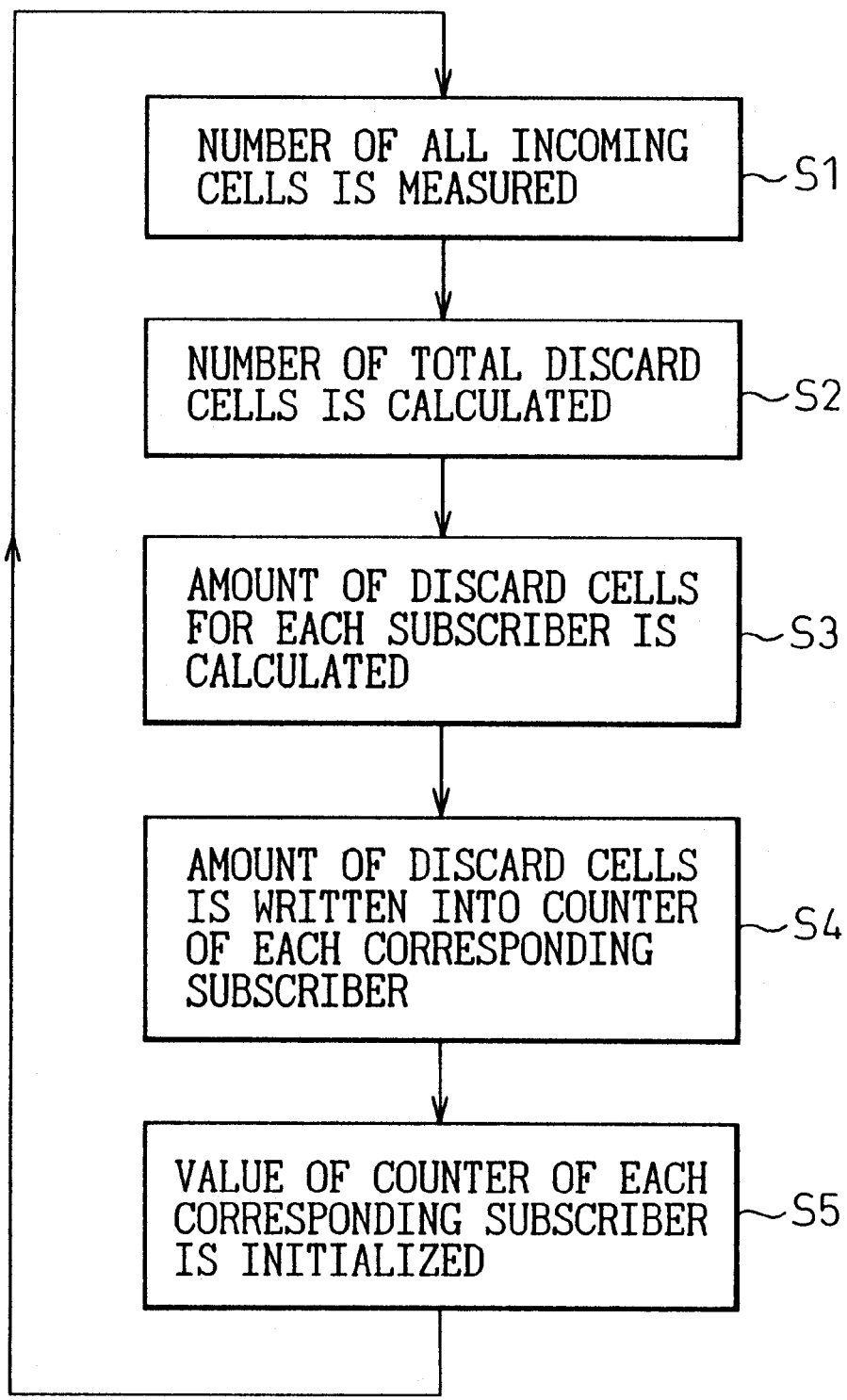
FIG. 19 is a flow chart of an example of a process for deciding cells to be discarded performed in the incoming cell amount decision device.

FIG. 19 is a flow chart of an example of the process of determination of cells to be discarded performed by the incoming cell amount decision device 23.

At step S1, the number Nin of all of the cells incoming per unit time is measured. This can be done by adding the values of the register 93 and register 94 by the CPU 91 of FIG. 18.

At step S2, the total amount of the cells which cannot be accepted by the exchange EX, that is, the total number Ndrop of the cells to be discarded, is counted. For example, the CPU 91 calculates $$Ndrop = Nin - Nex$$

Nex is the total amount of cells which can be accepted by the exchange EX (allowable number) (for example, see "24" in FIG. 24 and FIG. 25).

At step S3, the amount of cells which each subscriber should discard is calculated for each subscriber. Here, if there are two subscribers, that is, A and B, if it is set up in advance that the subscriber A discards an amount of cells proportional to the coefficient a ($0<a<1$), while the subscriber B discards an amount of cells proportional to the coefficient b ($0<b<1$), for example, the CPU 91 calculates:

Amount of cells to be discarded from subscriber A=Ndrop·a

Amount of cells to be discarded from subscriber B=Ndrop·b

In this case, if it is prescribed that cells are discarded evenly for the subscribers A and B, a=0.5 and b=0.5.

At step S4, the values of the above Ndrop·a and Ndrop·b are written into the corresponding counter A for subscriber A and counter B for subscriber B. For example, the CPU 91 writes the cumulative values of each of the above Ndrop·a and Ndrop·b into the memory area (A) and memory area (B) in an internal memory (not shown).

At step S5, after a predetermined time elapses (above mentioned unit time), the values of the counter A (memory area (A)) and counter B (memory area (B)) are cleared to zero (initialized) and the process returns to step S1.

Figure 20:
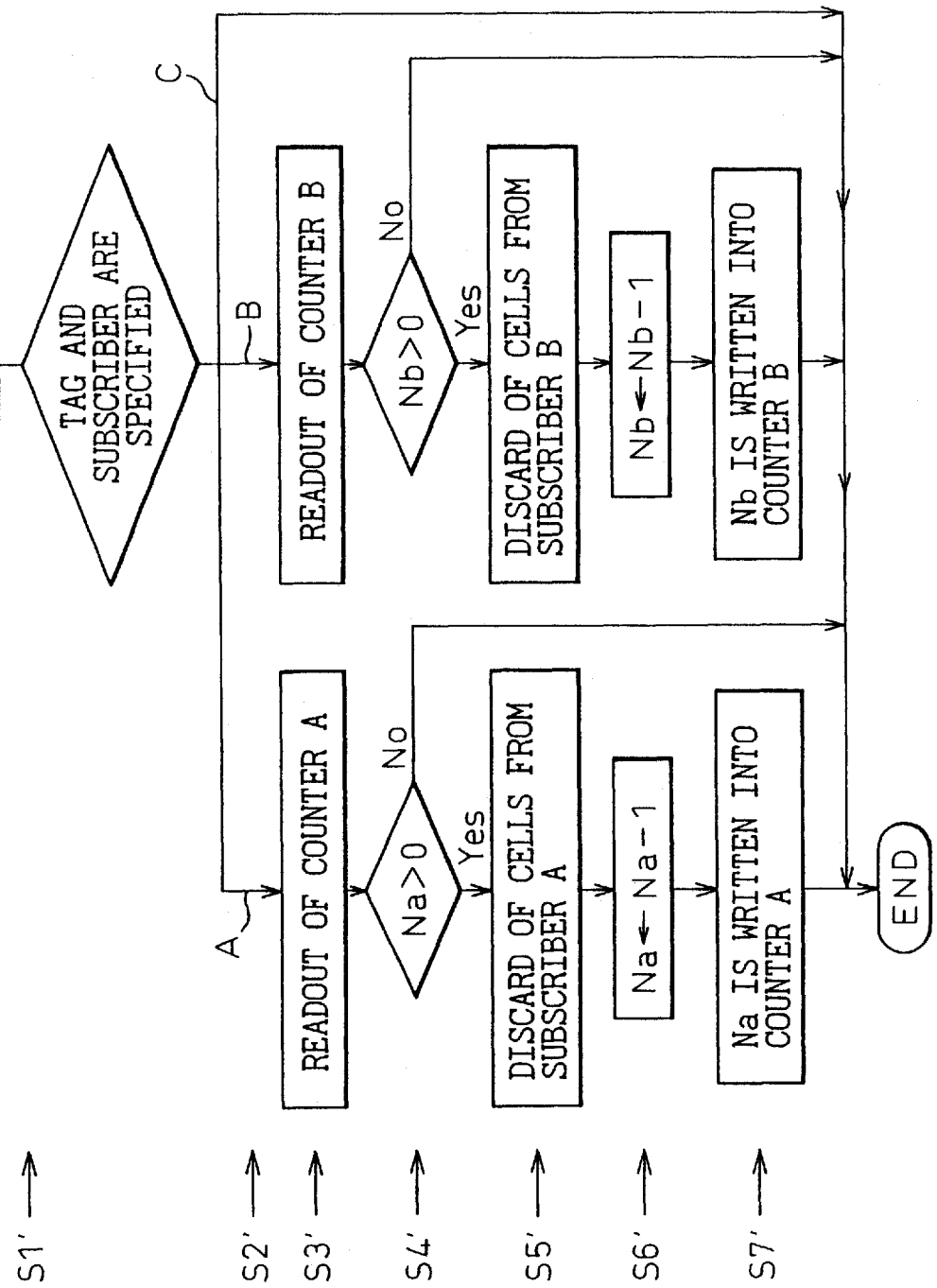
FIG. 20 is a flow chart of an example of a process for discarding cells performed in the incoming cell amount decision device.

FIG. 20 is a flow chart of an example of the process of discarding cells performed in the incoming cell amount decision device 23.

At step S1', the tag and originating subscriber of the incoming cell are specified for each cell which is input. Which subscriber the originating subscriber is may be written in the first octet shown in FIG. 11.

At step S2', if the tag is "0", the route C is automatically entered and the process ends (END). A tag of "0" shows that the cell is a fixed band cell. This input cell is removed from consideration of cell discard.

If the tag is "1", whether the incoming cell is a cell from the subscriber A or a cell from the subscriber B is specified and the route A or route B is entered. The same process is gone through for both the route A and the route B, so here only the route A will be looked at.

At step S3', the value Na (cumulative value of Ndrop·a) written in the counter A is read out. The read operation is performed for example by the above-mentioned CPU 91 (same for following process).

At step S4', it is decided if the above value Na is greater than zero or not (Na>0). When Na reaches zero (No), there are no longer any cells to be discarded, so the cell discarding process ends. When Na has not yet reached zero (Yes), the routine moves on to the next step.

At step S5', the cells from the subscriber A are discarded. This discard instruction (DIS) is sent through the interface 92 of FIG. 18 to the incoming cell limiting device 24.

At step S6', the above value Na is reduced by "1" each time one cell is discarded.

At step S7', the Na reduced by "1" is written into the counter A.

Figure 21:
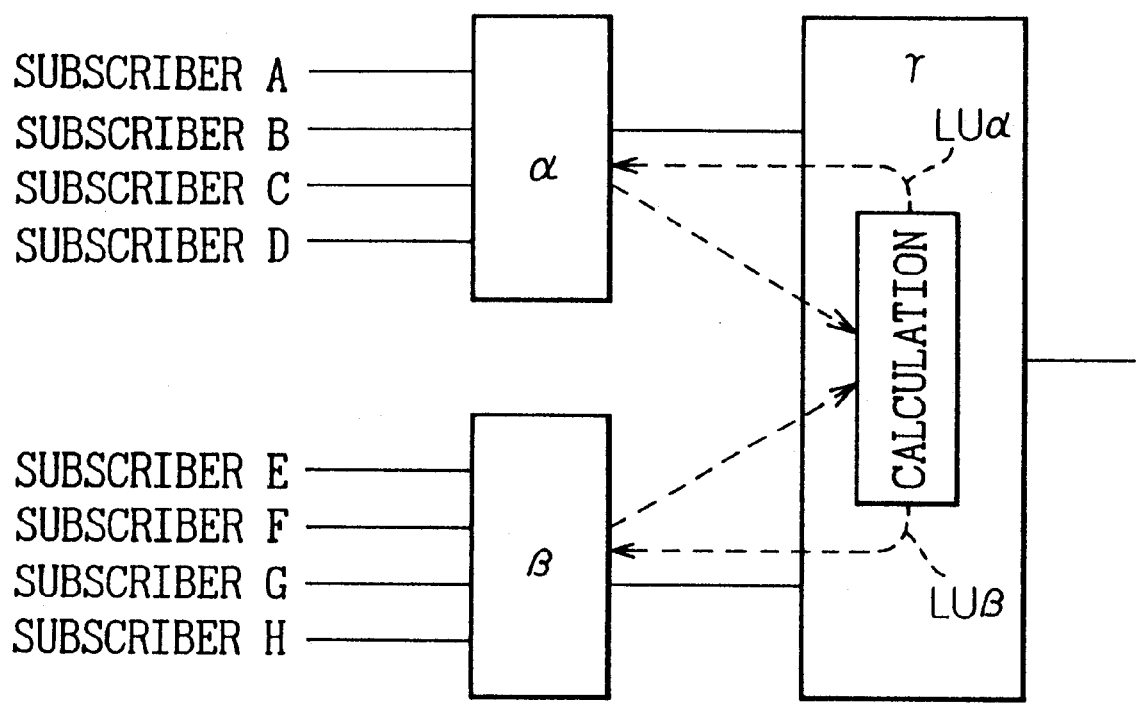
FIG. 21 is a view explaining in further detail portions relating to the higher apparatus interface and lower apparatus interface in FIG. 18.

FIG. 21 is a view explaining in detail the portion relating to the higher apparatus interface and lower apparatus interface in FIG. 18. In the figure, α shows the exchange EX according to the present invention, β is another exchange of the same type, and γ is an exchange higher than the exchanges α and β.

The higher exchange γ obtains information on the working band widths from the lower exchanges α and β, considers the band width which it can process itself at its own calculation unit, and returns the notifications LUα and LUβ of the cell flow limit to the lower exchanges.

The example shown here is that of the example of use in a case where the capacity of the higher apparatus is smaller than the total of the capacities of the lower apparatuses.

If the capacities of the exchanges are 80 cells for α, 80 cells for β, and 100 cells for γ, since the maximum capacity of γ is 100 cells, if α and β were to transmit their maximum cells, the total cell flow would become 160 cells, so it is necessary to discard 60 cells. If α and β are reduced by 30 cells each, a problem will arise when the subscribers A to D each use 20 variable band cells, the subscriber E uses 20 variable band cells, and the subscribers F to H use 20 fixed band cells each.

At this time, if the incoming cells from β is 50 cells, then only 10 cells can be given to a fixed band subscriber. Looking at this from γ, the fixed band cells become 20×3=60.

The variable band cells are 20×5=100. 100−60=40 becomes the maximum of the variable band cells. Dividing this 40 by 5 (A to E), one gets 40÷5=8, that is, it is necessary to reduce 8 cells for each subscriber. γ therefore notifies α by the LUα that it should be limited to 8×4=32.

Figure 22:
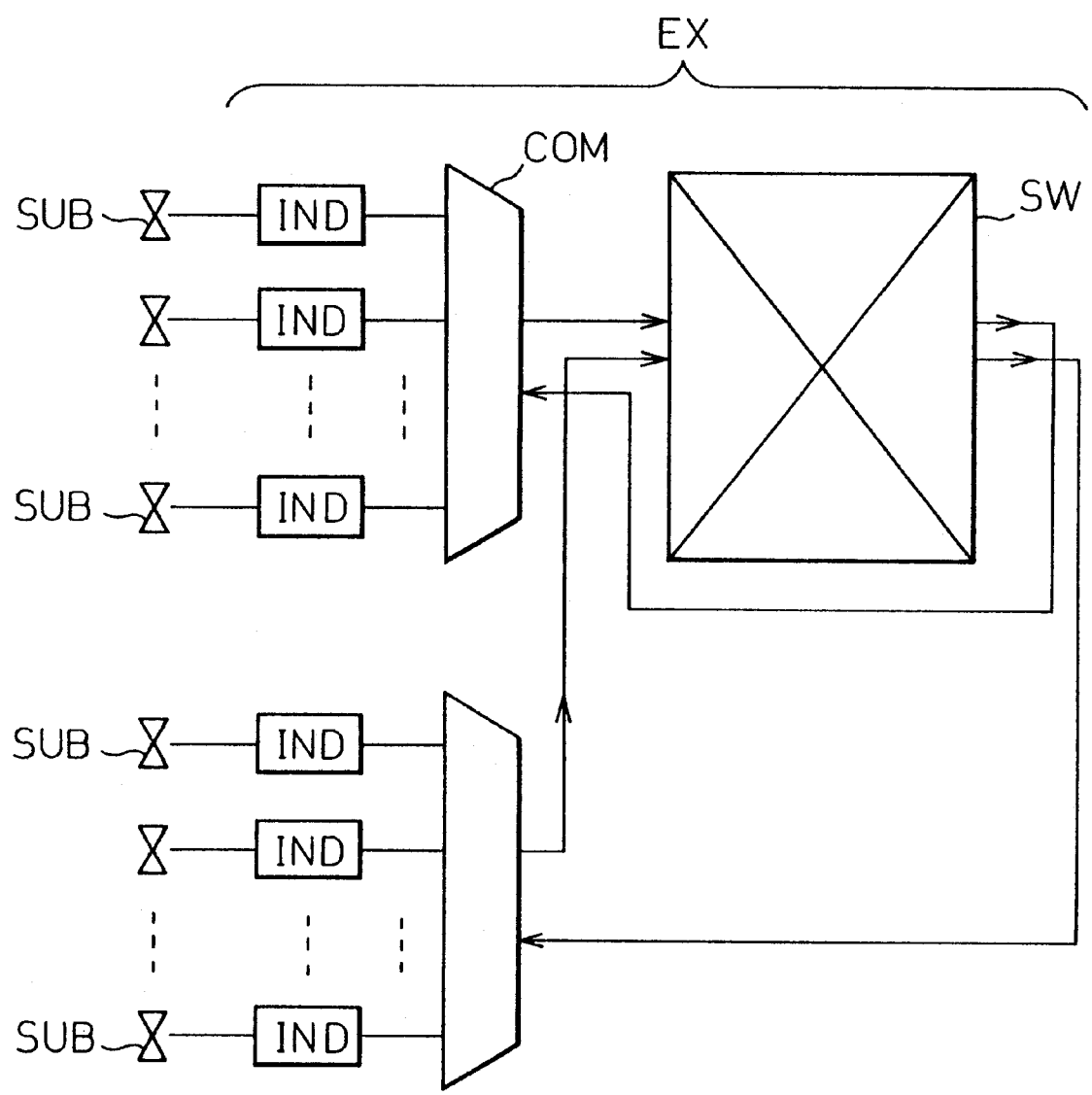
FIG. 22 is a view of an example of an exchange to which the present invention is applied.

FIG. 22 is a view of an example of an exchange to which the present invention is applied. In the figure, SUB shows the above-mentioned subscriber. A group of subscribers SUB are connected to respectively corresponding individual parts (IND) and terminated there.

The group of individual parts IND are further connected to a common part COM where lines are concentrated. That is, multiplexing (or demultiplexing) is performed.

A plurality of the above common parts COM are connected in common to a switch SW. The switch SW is comprised for example of MSSR (multistage self routing) modules. Cells are switched there. After switching, the cells are input to the common part COM accommodating the destination subscriber SUB. Note that the above switching is performed based on the VPI/VCI shown in FIG. 11 and in accordance with routing tags (different from previously mentioned tags) added in the exchanges. The routing tags are deleted before the cells enter the above common part COM accommodating the destination subscriber SUB.

In FIG. 22, the traffic control apparatus according to the present invention is incorporated into each common part COM. The common part COM is the portion into which cells from a large number of subscribers SUB flow, so it is best to discard cells at this common part COM.

Figure 23:
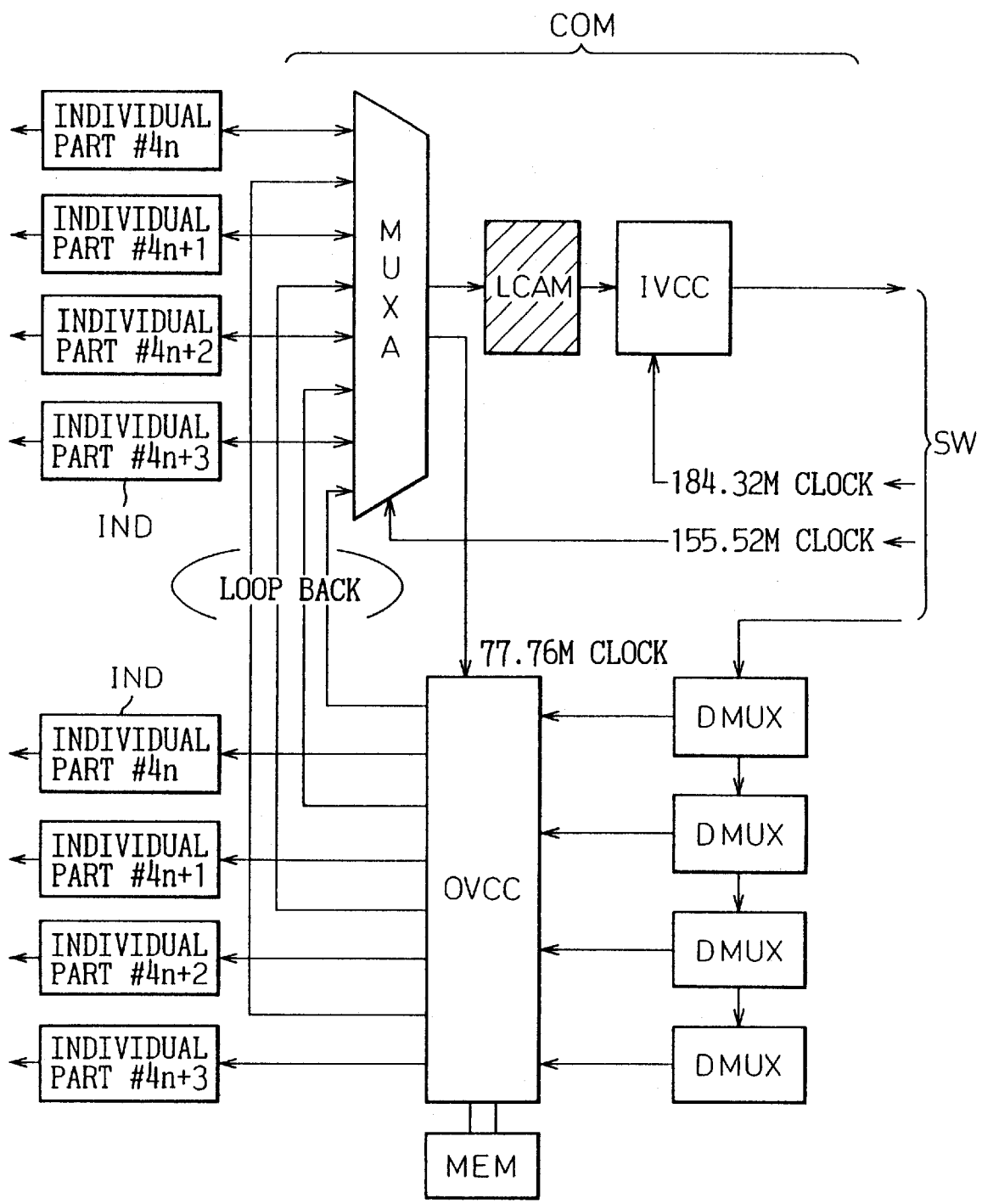
FIG. 23 is a view of a specific example of a common part COM shown in FIG. 22.

FIG. 23 is a view of a more detailed example of a common part COM shown in FIG. 22. The traffic control apparatus according to the present invention is incorporated into the common part COM. It is particularly preferred to provide, in the COM, the traffic control apparatus in the degeneracy unit, i.e., LCAM (large scale contents addressing memory).

In the figure, the multiplexing unit MUXA is connected to the individual part IND. The 156M upstream data highway cells from the individual part IND are input to the multiplexing unit MUXA, multiplexed into four lines worth of cells, and output from the MUXA as 622M highway cells. Note that the multiplexing unit MUXA is a simple time multiplexing function unit.

Further, the multiplexing unit MUXA receives as input 156M loopback highway cells from the later explained output table unit (OVCC). The multiplexing unit MUXA also functions to select one of the loopback highway cells or the upstream highway cells from the individual parts IND. There are two modes of selection: the multiple loopback mode I which multiplexes just loopback highway cells and the "cell by cell" loopback mode II which multiplexes just cells with valid "T" bits in the cell header parts on the loopback highway while embedding them in empty cells on the upstream highway from the individual parts IND.

Note that normally four multiplexing units MUXA are arranged in parallel (0/1/2/3), but in FIG. 23, just one is shown. In FIG. 23, the individual parts IND are discriminated as "4n", "4n+1", "4n+2", and "4n+3" for this reason (n is 0, 1, 2, or 3). That is, a total of 16 individual parts IND are accommodated.

The above multiplexing unit MUXA is connected to the above degeneracy unit LCAM in which the traffic control apparatus of the present invention is incorporated. The 662M output highway cells from the multiplexing unit MUXA are given an internal channel identifier-A (ICID-A) at the degeneracy unit LCAM with reference to the IVPI (input VPI, 12 bits) and IVCI (input VCI, 16 bits). This function is for degeneration of the VPI/VCI of the value $2^{28}$ and can perform a translation to 4096 ICID-A's per line. Further, a "C" bit for showing the type of the connection, that is, a point-to-point (P–P) connection/point-to-multipoint (P–M) connection, and a "VP" bit showing the type of the VC service/VP service are simultaneously added.

At the next stage of the degeneracy unit LCAM, an input table part IVCC is connected. A switch SW of FIG. 22 is reached through this. The IVCC performs header translation (VCC translation) based on the ICID-A on the 662M output highway from the LCAM. This VCC translation differs in translation processing between P–P connections and P–M connections. At the time of P–P connections, the bits of the quality control path (QCP), OVPI (output VPI), and OVCI (output VCI) and routing tag in the switch SW are mapped in the cell header part.

On the other hand, at the time of P–M connection, the QCP, ICID-B (internal channel identifier), and bit map tag for routing in the switch SW are mapped in the cell header parts.

Further, the IVCC translates the 54 octet length to 64 octet length and outputs the resultant cells.

Next, explaining the downstream path, the cells from the switch SW (FIG. 22) are input to the demultiplexing unit DMUX. The demultiplexing unit DMUX receives the downstream 2.9G highway cells from the switch SW and demultiplexes the cells onto the 622M highway.

The downstream highway cells from the switch SW runs through demultiplexing units DMUX for four lines. The demultiplexing units DMUX also perform a band management and a quality management.

The demultiplexing unit DMUX rearranges the position of accommodation of the tag-D field in the header parts of the incoming cell. Further, the demultiplexing unit DMUX searches through the ICID-C degeneracy memory and performs translation to the ICID-C for degeneracy using the ICID-B in the cell header part as the address only for P–M connection cells. The retrieved ICID-C is inserted into the header part and the resultant cell is output. Note that this ICID degeneracy is not performed with respect to P–P connection cells. Therefore, the output from the 622M highway of DMUX is input to the OVCC.

The above demultiplexing unit DMUX is connected to an output table part OVCC. The OVCC accesses the memory MEM of the OVCC and searches for the OVPI and OVCI by the ICID-C field in the header part of the cells only for P–M connection cells on the input 622M highway.

The memory MEM of the above OVCC is a memory table of a chain structure for multicasting and stores the next address in the same chain structure and a flag showing the end of the chain.

Note that the maximum number of multicasts on one line is 256. Therefore, the retrieved OVPI and OVCI are mapped in the header portion of the cells. In the OVCC, further, 64 octets are converted to 54 octets. After conversion to 54 octets, the cells are output to the individual parts IND at 622M.

As explained above, according to the present invention, it is possible to provide a fair channel service to subscribers using the variable band service, e.g., UBR service.

What is claimed is:

1. A traffic control apparatus which controls the traffic of cells on a set up channel in which cells of a plurality of service classes are transferred mixed, provided with:

a detecting means for detecting congestion of traffic on the channel, and an adjusting means for adjusting for a plurality of subscribers' respective degrees of discarding of cells thereof belonging to the same type of service class in accordance with respective predetermined ratios after being notified of detection of congestion from said detecting means.

2. A traffic control apparatus in an exchange comprising:

an incoming cell analyzing means for identifying if cells coming in from subscribers are fixed band cells for which fixed band service is applied or variable band cells for which variable band service is applied, separating the two, and calculating the flow of all of the fixed band cells, that is, the total fixed band cell flow, and the flow of all of the variable band cells, that is, the total variable band cell flow, an incoming cell amount decision means for outputting a cell discard instruction, when the sum of the total fixed band cell flow and the total variable band cell flow calculated by said incoming cell analyzing means, that is, the sum total cell flow, exceeds an allowable cell flow which can pass through the exchange, for allocating an amount of cells to be discarded, corresponding to the excess cell flow among subscribers receiving the variable band service by a predetermined ratio; and an incoming cell limiting means for discarding cells from among the incoming variable band cells for each subscriber input to the exchange in accordance with the cell discard instruction output from said incoming cell amount decision means.

3. A traffic control apparatus as set forth in claim 2, further including a cell buffer means for temporarily buffering cells generated in burst.

4. A traffic control apparatus as set forth in claim 2, wherein when the number of subscribers receiving the variable band service is N (N is a natural number), the incoming cell amount decision means allocates to each subscriber an amount of cells to be discarded, corresponding to 1/N the overall amount of cells to be discarded as a cell discard instruction for each subscriber.

5. A traffic control apparatus as set forth in claim 2, wherein when the number of subscribers receiving the variable band service is N (N is a natural number) and the subscribers apply for working band widths (BR) of BR1, BR2, . . . BRN, the incoming cell amount decision means allocates the amount of cells to be discarded at a ratio of the working band widths BR1, BR2 ... BRN as the cell discard instruction for each subscriber.

6. A traffic control apparatus as set forth in claim 2, wherein, when the flow of incoming cells is limited in a higher apparatus located higher side than the exchange, in order to receive the limiting information showing the limited incoming cell flow from the higher apparatus, said incoming cell analyzing means is provided with a transmitting unit for transmitting information on the sum total cell flow to the higher apparatus and said incoming cell amount decision means sets the amount of cells to be discarded based on the allowable cell flow reduced by the limiting information in response to the transmitted sum total cell flow information.

7. A traffic control apparatus as set forth in claim 2, wherein said incoming cell limiting means has an empty cell decision unit for deciding if each variable band cell is an empty cell including no significant information or not and discards cells giving priority to variable band cells decided to be empty cells by the empty cell decision unit.

8. A traffic control apparatus as set forth in claim 2, wherein provision is made of a fixed band cell highway and a variable band cell highway for separately transferring the fixed band cells and variable band cells separated by the incoming cell analyzing means and said incoming cell limiting means has a cell combining unit which receives fixed band cells from the fixed band cell highway as they are at a first input, receives the limited variable band cells obtained by performing a cell discard operation for the variable band cells from the variable band cell highway at another input, and aligns the two received inputs and outputs the same.

9. A traffic control apparatus as set forth in claim 2, wherein said incoming cell analyzing means has a first multiplexing unit for multiplexing both the separated fixed band cells and variable band cells and placing the result on a single cell highway and said incoming cell limiting means has a separating means for separating the cells output from the cell highway once again into the fixed band cells and variable band cells and a second multiplexing unit for multiplexing the limited variable band cells obtained by performing a cell discard operation on the separated variable band cells and the above output cells and outputting the same.

10. A traffic control apparatus as set forth in claim 2, wherein said incoming cell amount decision means has a communication means for obtaining from said incoming cell analyzing means flow information relating to the total fixed band cell flow and the total variable band cell flow and wherein said communication means transmits said flow information by a periodic read method.

11. A traffic control apparatus as set forth in claim 2, wherein said incoming cell amount decision means has a communication means for obtaining from said incoming cell analyzing means flow information relating to the total fixed band cell flow and the total variable band cell flow and wherein said communication means transmits said flow information by an interruption notification method which starts up an interruption only when the flow information changes.

12. A traffic control apparatus as set forth in claim 2, wherein said incoming cell amount decision means has a communication means for obtaining from said incoming cell analyzing means flow information relating to the total fixed band cell flow and the total variable band cell flow and wherein said communication means transmits said flow information by a DMA communication method when the flow information changes.

13. A traffic control apparatus as set forth in claim 2, wherein said incoming cell analyzing means has an identification information adding unit for adding to the input cells at least information for identifying if they are fixed band cells or variable band cells.

14. A traffic control apparatus as set forth in claim 4, wherein said incoming cell limiting means has a cell alignment unit for aligning the cells (CA, CB, CC ... ) input from a plurality of subscribers (A, B, C ... ) repeatedly in the order of A, B, C ... and a cell discarding unit for discarding at least one unit's worth of cells, a unit being the number of cells equal to the number of subscribers, from the input cells.

15. A traffic control method in an exchange, comprising a first step of identifying if cells coming in from subscribers are fixed band cells for which a fixed band service is applied or variable band cells for which a variable band service is applied and separating the two, a second step of calculating the flow of all of the fixed band cells, that is, the total fixed band cell flow, and the flow of all of the variable band cells, that is, the total variable band cell flow, a third step for outputting a cell discard instruction, when the sum of the total fixed band cell flow and the total variable band cell flow calculated, that is, the sum total cell flow, exceeds an allowable cell flow which can pass through the exchange, for allocating an amount of cells to be discarded, corresponding to the excess cell flow among subscribers receiving the variable band service by a predetermined ratio; and a fourth step of discarding cells from among the incoming variable band cells input to the exchange for each subscriber in accordance with the said cell discard instruction.

16. A traffic control method as set forth in claim 15, further including a step for temporarily buffering cells generated in burst.

17. A traffic control method as set forth in claim 15, wherein when the number of subscribers receiving the variable band service is N (N is a natural number), the third step allocates to each subscriber an amount of cells to be discarded, corresponding to 1/N the overall amount of cells to be discarded as cell discard instruction for each subscriber.

18. A traffic control method as set forth in claim 15, wherein when the number of subscribers receiving the variable band service is N (N is a natural number) and the subscribers apply for working band widths (BR) of BR1, BR2, ... BRN, the third step allocates the amount of cells to be discarded at a ratio of the working band widths BR1, BR2 ... BRN as the cell discard instruction for each subscriber.

19. A traffic control method as set forth in claim 15, wherein said fourth step includes a step of deciding if each variable band cell is an empty cell including no significant information or not and discarding cells giving priority to variable band cells decided to be empty cells.

20. A traffic control method as set forth in claim 15, wherein said first step has a step for adding to the input cells at least information for identifying if they are fixed band cells or variable band cells.

21. A traffic control method as set forth in claim 17, wherein said fourth step has a step for aligning the cells (CA, CB, CC . . . ) input from a plurality of subscribers (A, B, C . . . ) repeatedly in the order of A, B, C . . . and a step for discarding from the input cells at least one unit's worth of cells, a unit being the number of cells equal to the number of subscribers.

* * * * *